United States Patent
Lukacs et al.

(10) Patent No.: US 12,460,981 B2
(45) Date of Patent: Nov. 4, 2025

(54) MICROMECHANICAL COMPONENT FOR A CAPACITIVE PRESSURE SENSOR DEVICE, CAPACITIVE PRESSURE SENSOR DEVICE, AND A MANUFACTURING METHOD FOR A CAPACITIVE PRESSURE SENSOR DEVICE

(71) Applicant: Robert Bosch GmbH, Stuttgart (DE)

(72) Inventors: Ferenc Lukacs, Budapest (HU); Mate Erdosi, Dunakeszi (HU); Raschid Baraki, Reutlingen (DE); Sophielouise Mach, Reutlingen (DE); Thomas Friedrich, Moessingen-Oeschingen (DE); Volkmar Senz, Metzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 339 days.

(21) Appl. No.: 18/256,952

(22) PCT Filed: Nov. 18, 2021

(86) PCT No.: PCT/EP2021/082061
§ 371 (c)(1),
(2) Date: Jun. 12, 2023

(87) PCT Pub. No.: WO2022/128302
PCT Pub. Date: Jun. 23, 2022

(65) Prior Publication Data
US 2024/0035910 A1    Feb. 1, 2024

(30) Foreign Application Priority Data
Dec. 16, 2020 (DE) ............ 10 2020 215 985.8

(51) Int. Cl.
*G01L 9/04* (2006.01)
*G01L 9/00* (2006.01)
*G01L 19/06* (2006.01)

(52) U.S. Cl.
CPC .......... *G01L 9/0047* (2013.01); *G01L 9/0073* (2013.01); *G01L 19/0618* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 5,488,869 A * 2/1996 Renaud ............... G01L 9/0042
73/718
6,945,115 B1 * 9/2005 Wang .................. G01L 9/0073
73/718
(Continued)

FOREIGN PATENT DOCUMENTS

DE     10030352 A1   1/2002
DE  102004036032 A1   7/2005
(Continued)

OTHER PUBLICATIONS

Hao et al. "An Annular Mechanical Temperature Compensation Structure for Gas-Sealed Capacitive Pressure Sensor" Sensors (2012); pp. 8026-8038.
(Continued)

*Primary Examiner* — Andre J Allen
(74) *Attorney, Agent, or Firm* — NORTON ROSE FULBRIGHT US LLP

(57) ABSTRACT

A micromechanical component. The micromechanical component includes: a substrate; a frame structure which frames a partial surface of the substrate and/or an interlayer applied to the substrate, at least one electrode being mounted on the framed partial surface and/or interlayer; a pressure-sensitive membrane on which an external pressure acts and which brings about a deformation, wherein a self-supporting area of the membrane spans the framed partial surface and/or
(Continued)

interlayer, the self-supporting area having at least one movable counterelectrode directed toward the framed partial surface and/or interlayer; and a sealed cavity having a reference pressure, surrounded by the membrane and the frame structure; wherein the self-supporting area of the membrane has local reinforcement structures for increasing a membrane thickness of the self-supporting area, the local reinforcement structures being mounted in particular regions of the self-supporting area where the membrane thickness of the self-supporting area changes.

11 Claims, 25 Drawing Sheets

(58) Field of Classification Search
CPC .............. G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L USPC .................................................. 73/700–756
See application file for complete search history.

(56) References Cited

U.S. PATENT DOCUMENTS

| | | | |
|---|---|---|---|
| 8,779,536 B2* | 7/2014 | Weber | B81B 3/0021 |
| | | | 257/621 |
| 9,156,675 B2* | 10/2015 | Kaelberer | B81C 1/00682 |
| 9,249,008 B2* | 2/2016 | Hsu | G01L 9/0073 |
| 11,912,563 B2* | 2/2024 | Artmann | G01L 7/082 |
| 11,933,689 B2* | 3/2024 | Weber | G01L 19/0061 |
| 11,976,995 B2* | 5/2024 | Reinmuth | B81B 3/0059 |
| 2013/0068022 A1 | 3/2013 | Jeung et al. | |
| 2014/0352445 A1 | 12/2014 | Kuisma | |
| 2020/0200631 A1* | 6/2020 | Friedrich | G01L 1/148 |
| 2024/0288324 A1* | 8/2024 | Kreutzer | G01L 9/0072 |

FOREIGN PATENT DOCUMENTS

| | | | | |
|---|---|---|---|---|
| DE | 102007053280 A1 | | 5/2009 | |
| DE | 102011084020 A1 | | 11/2012 | |
| DE | 102017208436 A1 | | 12/2017 | |
| DE | 102018222712 A1 | | 6/2020 | |
| DE | 102019205349 A1 | * | 10/2020 | ............... G01L 9/12 |
| EP | 2058639 A2 | | 5/2009 | |

OTHER PUBLICATIONS

International Search Report for PCT/EP2021/082061, Issued Mar. 1, 2022.

* cited by examiner

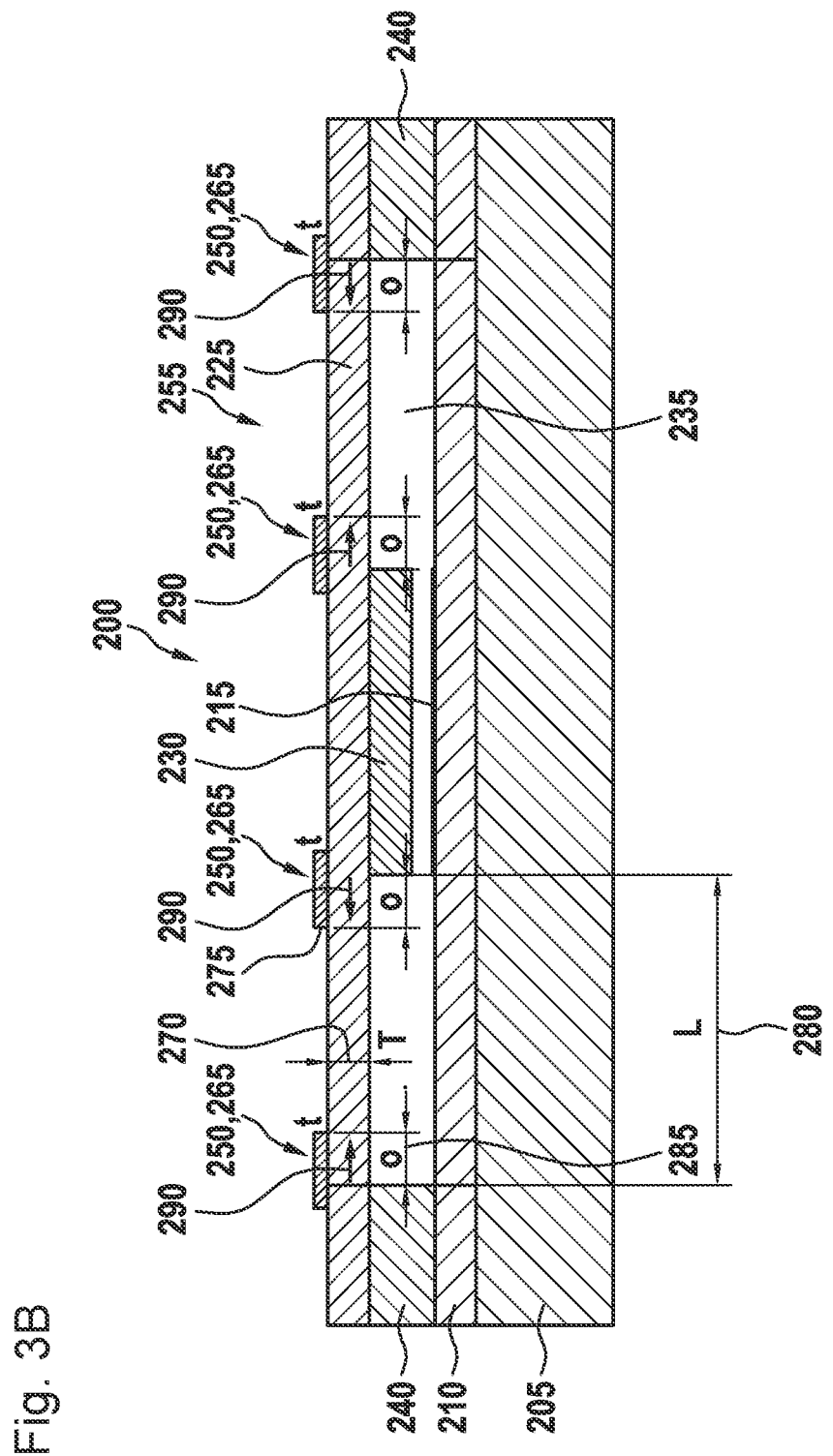

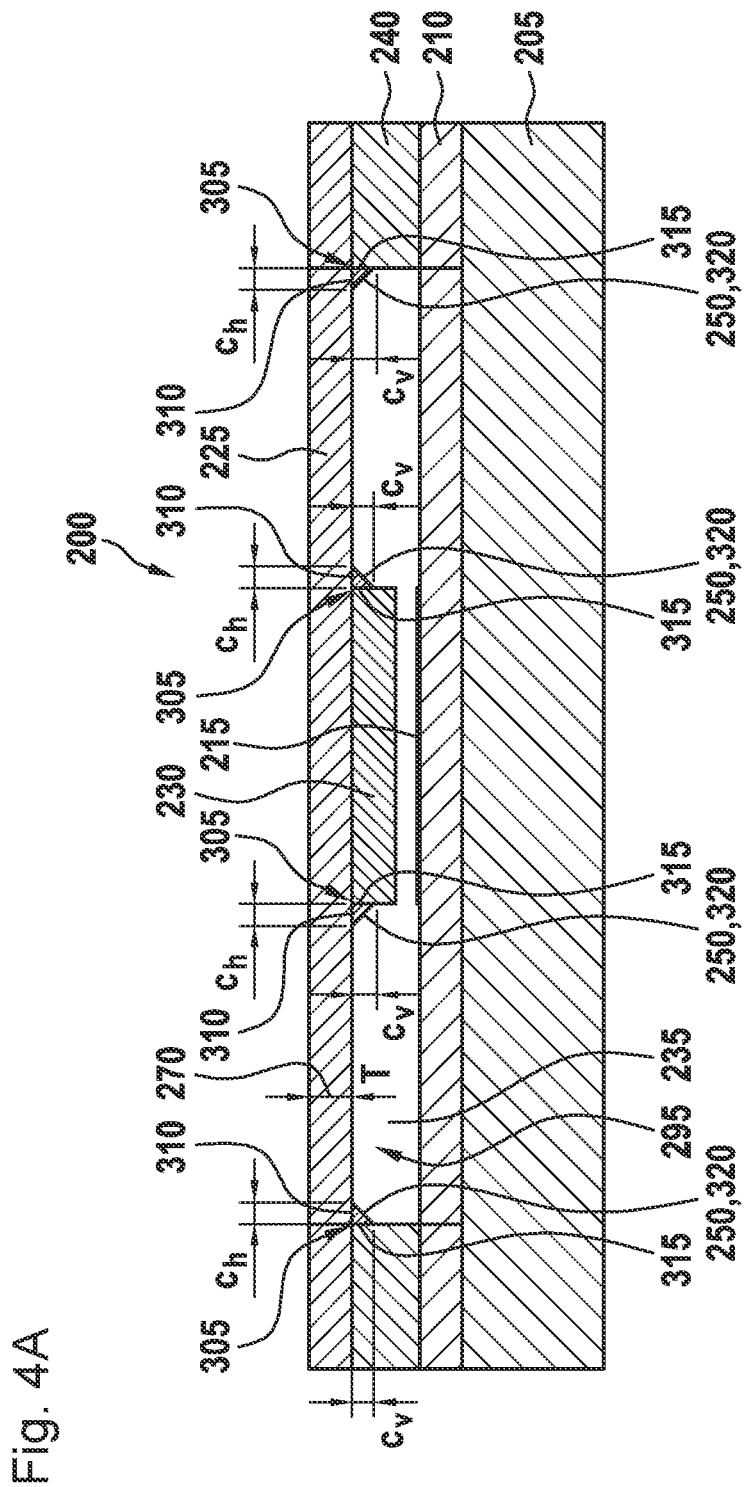

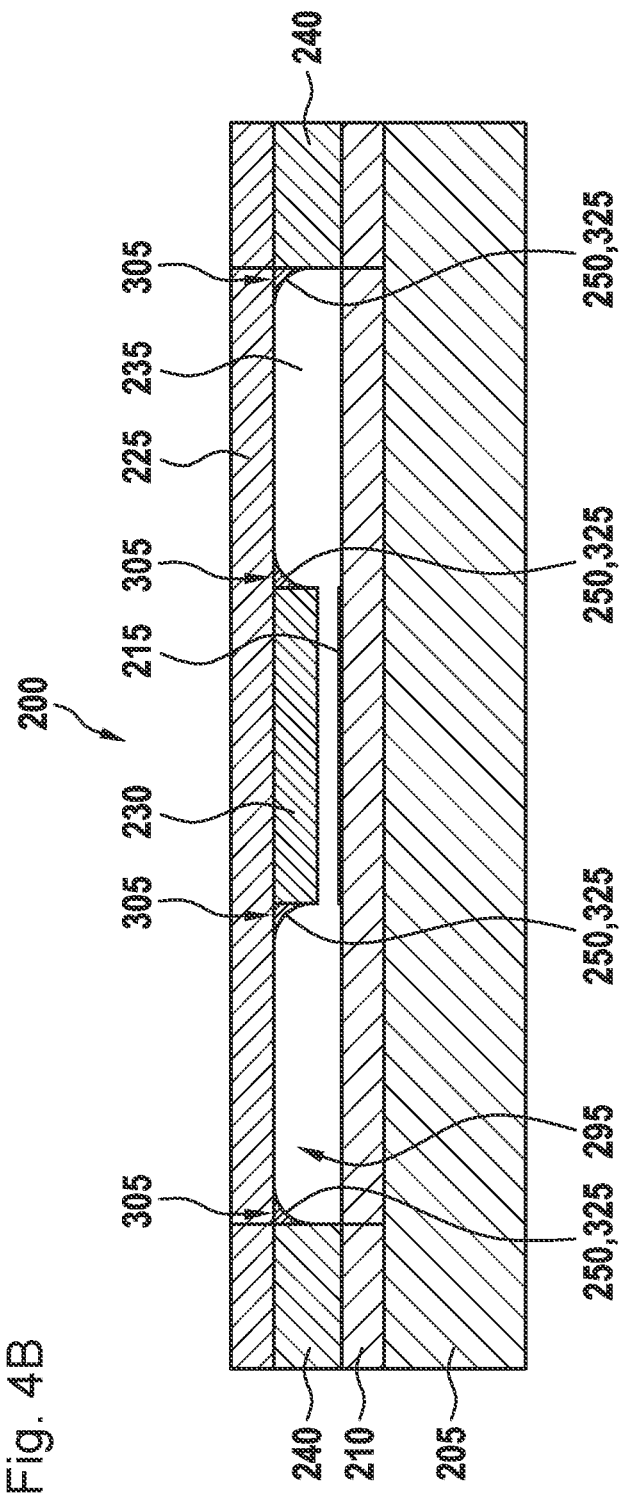

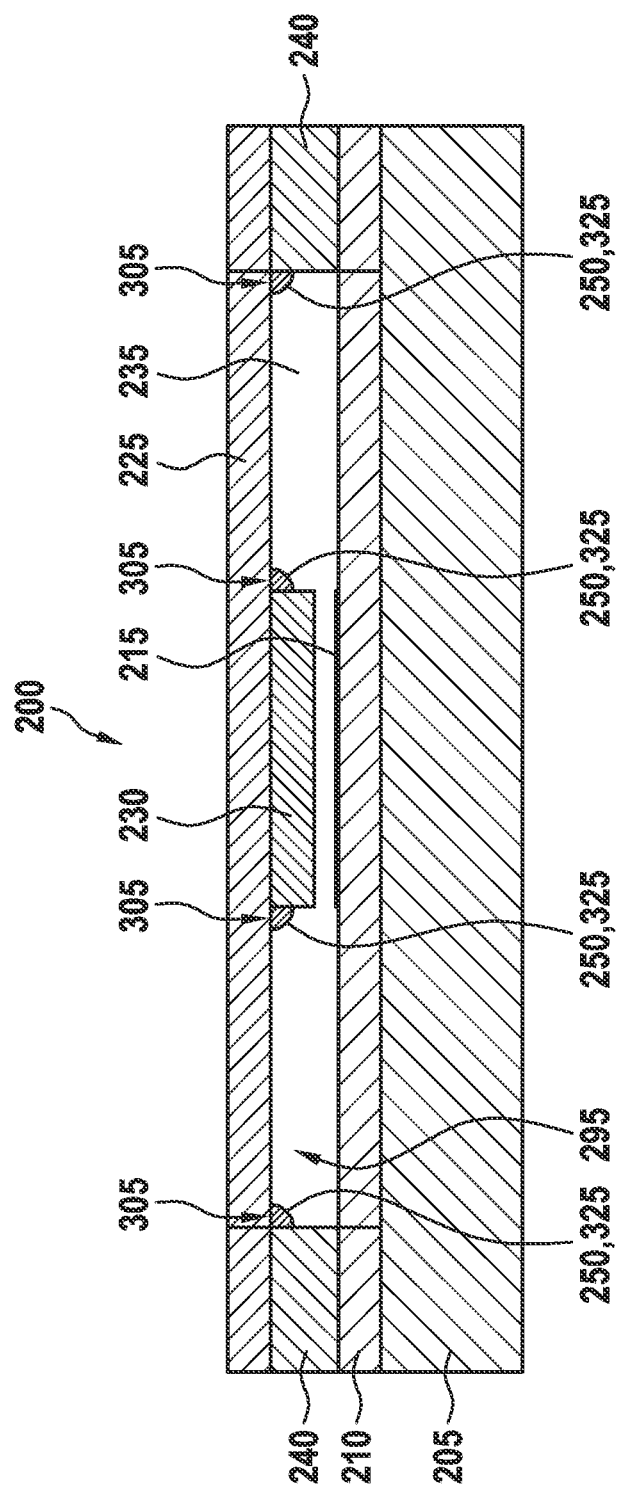

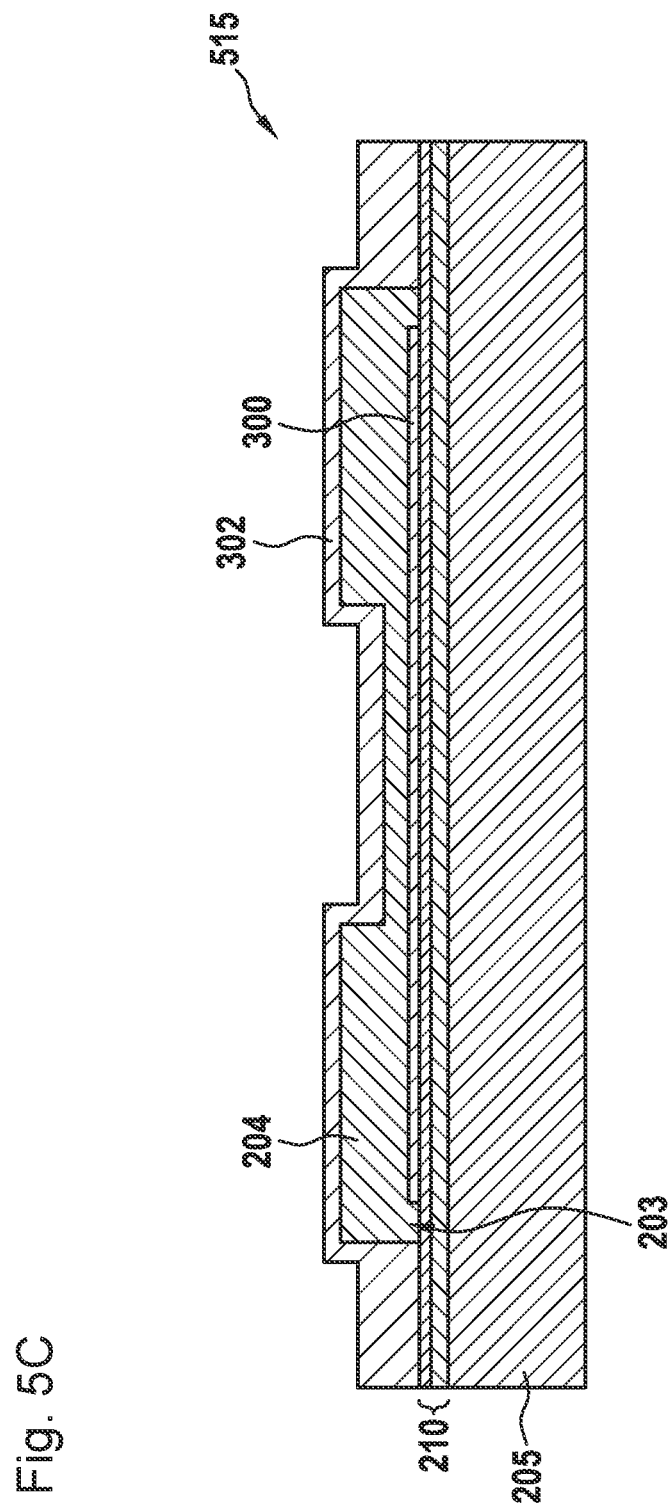

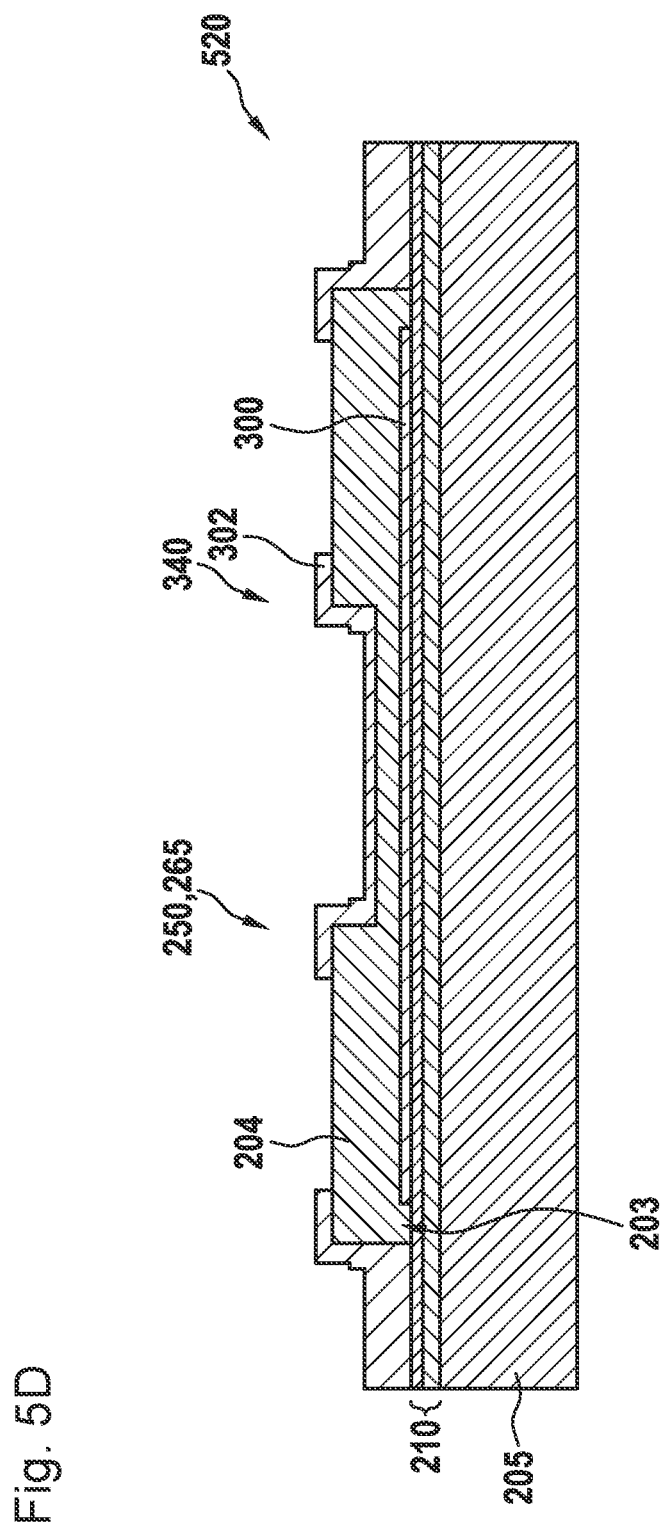

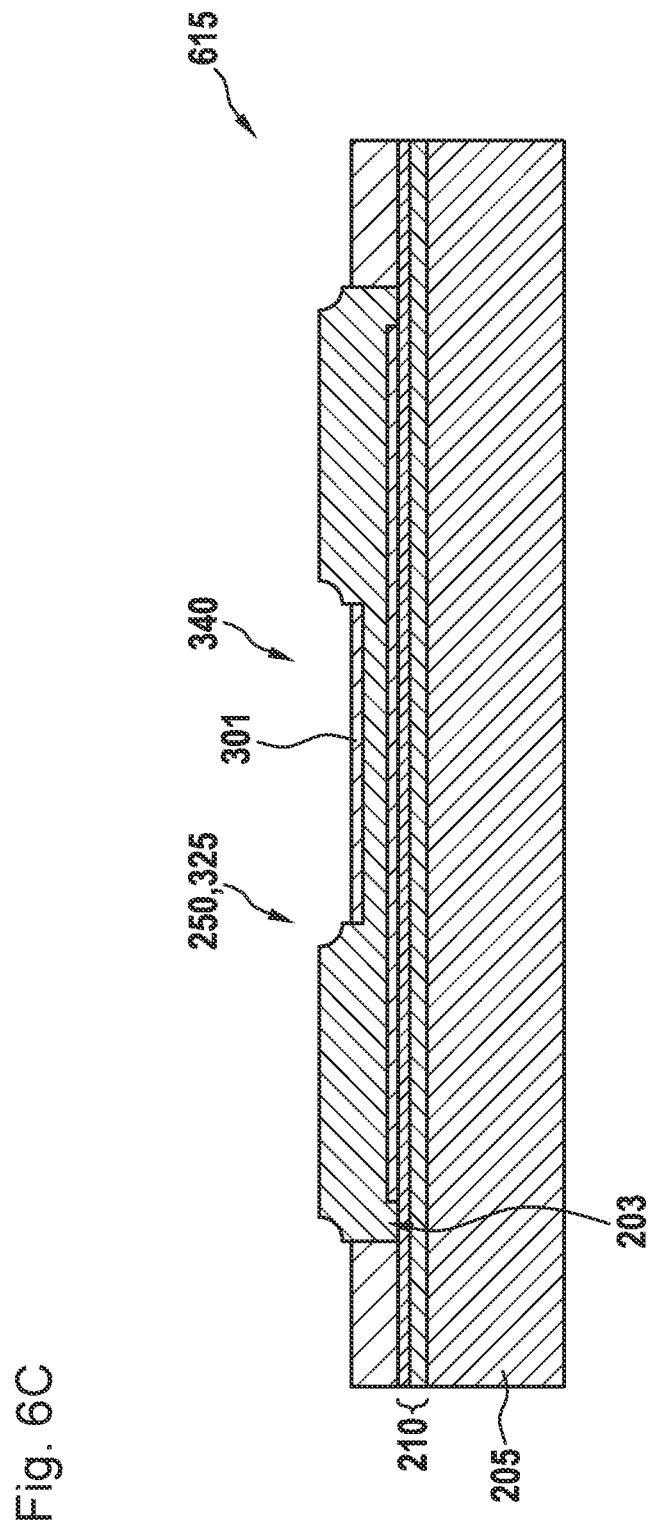

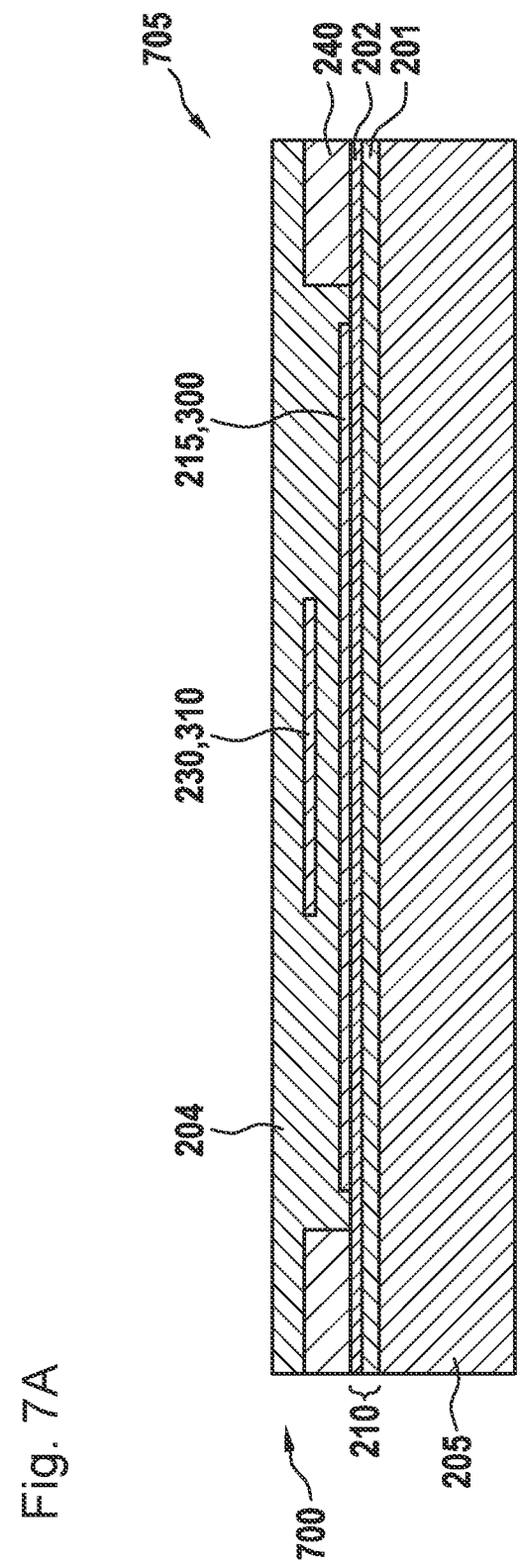

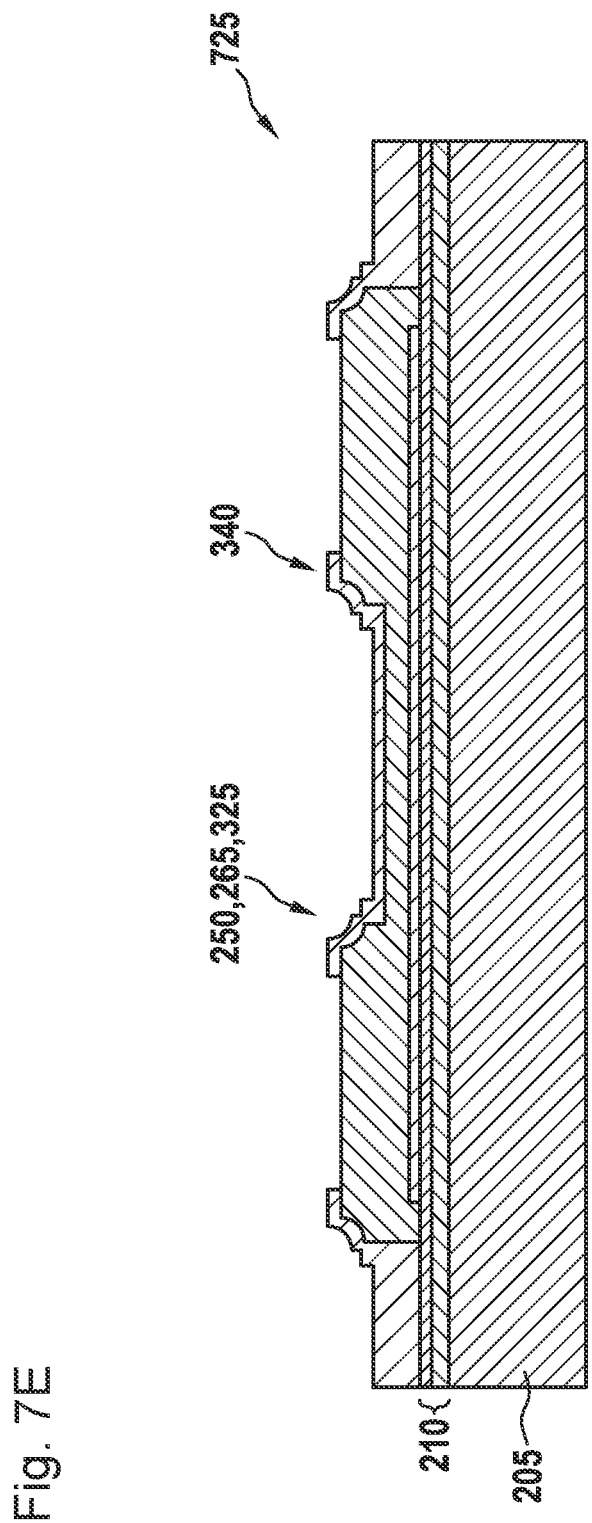

MICROMECHANICAL COMPONENT FOR A CAPACITIVE PRESSURE SENSOR DEVICE, CAPACITIVE PRESSURE SENSOR DEVICE, AND A MANUFACTURING METHOD FOR A CAPACITIVE PRESSURE SENSOR DEVICE

FIELD

The present invention relates to a micromechanical component for a capacitive pressure sensor device, a capacitive pressure sensor device, and a manufacturing method for a capacitive pressure sensor device.

BACKGROUND INFORMATION

Capacitive pressure sensor devices with micromechanical components and a manufacturing method for such a micromechanical component are described in German Patent Application No. DE 10 2018 222 712 A1.

SUMMARY

It is an object of the present invention to provide an improved micromechanical component for a capacitive pressure sensor device and an optimized capacitive pressure sensor device. Furthermore, it is an object of the present invention to provide an improved, more robust design for reinforcement and to specify a corresponding manufacturing method for it.

This object may be achieved by the features of the present invention. Advantageous embodiments of the present invention are disclosed herein.

A micromechanical component for a capacitive pressure sensor device and a capacitive pressure sensor device are provided. According to an example embodiment of the present invention, the capacitive pressure sensor device comprises the micromechanical component as well as an electronic signal processing unit for generating a measurement signal via an external pressure $p_{ext}$ acting on the micromechanical component, based on an evaluation of a voltage applied between at least one electrode and at least one movable counterelectrode of the micromechanical component, or of a capacitance. The micromechanical component comprises:
  a substrate,
  a frame structure, which frames a partial surface of the substrate and/or an interlayer applied to the substrate, wherein at least one electrode has been mounted on the framed partial surface and/or the framed interlayer,
  a pressure-sensitive membrane on which an external pressure $p_{ext}$ acts, wherein the pressure-sensitive membrane is stretched by means of the frame structure in such a way that a self-supporting area of the pressure-sensitive membrane spans the framed partial surface and/or the framed interlayer, wherein the action of the external pressure $p_{ext}$ brings about a deformation of the pressure-sensitive membrane on an outer side of the self-supporting area, wherein the outer side is directed away from the partial surface and/or the interlayer,
wherein the self-supporting area of the pressure-sensitive membrane has at least one movable counterelectrode directed toward the framed partial surface and/or the framed interlayer, and
  a sealed cavity having a reference pressure $p_0$, which is surrounded by the pressure-sensitive membrane and the frame structure,
wherein the self-supporting area of the pressure-sensitive membrane has local reinforcement structures for increasing a membrane thickness of the self-supporting area, and
wherein the local reinforcement structures are mounted in particular regions of the self-supporting area where the membrane thickness of the self-supporting area changes, i.e., in regions of the self-supporting area where increased mechanical stresses can occur when loaded.

Using the proposed design according to the present invention, of the capacitive pressure sensor device comprising the micromechanical component, reliable operation of the sensor can be ensured even when overloaded. A scenario of an overload case may, for example, correspond to excess pressure acting on the self-supporting area of the membrane, so that the self-supporting area is deformed toward the cavity. The reverse case is also possible, in which the self-supporting area is deformed away from the cavity, for example when the component detaches from an adhesive connection. In particular, the mentioned overload cases may occur during the manufacturing process of the capacitive pressure sensor device or of the micromechanical component.

The local reinforcement structures can, above all, improve the mechanical robustness of the membrane or the mechanical robustness of the self-supporting area of the membrane. The local reinforcement structures may in part result in local stiffening of the self-supporting area of the membrane and thus bring about reduced sensitivity of the pressure sensor device during a pressure deflection. In order to still ensure a nearly constant sensitivity of the capacitive pressure device in such a case, this stiffening of the self-supporting area of the membrane can be purposefully compensated by further design parameters of the movable membrane, e.g., the length of the local reinforcement structures.

In a further embodiment of the present invention, the local reinforcement structures are arranged on the outer side of the self-supporting area of the pressure-sensitive membrane, or the local reinforcement structures are arranged on an inner side of the self-supporting area of the pressure-sensitive membrane, which is directed toward the partial surface and/or the interlayer, or the local reinforcement structures are arranged on the outer side of the self-supporting area and on the inner side of the self-supporting area of the membrane.

In particular, the local reinforcement structures may be flexibly mounted on the outer side, inner side, or outer side and inner side of the self-supporting area of the membrane and do not require complicated manufacture. Accordingly, the very flexible process of manufacturing the micromechanical component, which enables the insertion or installation of any number of layers from which, among other things, the local reinforcement structures can be formed, is advantageous. Using the targeted local reinforcement of the self-supporting area of the membrane by means of the local reinforcement structures on the outer side of the self-supporting area and on the inner side of the self-supporting area in the particular regions where the membrane thickness of the self-supporting area changes, the mechanical load or stress that can occur in the two overload cases described above and acts on the mentioned regions can, for example, be reduced by up to 30 percent compared to the case without local reinforcement.

In a further embodiment of the present invention, the local reinforcement structures are arranged on the outer side of the self-supporting area of the pressure-sensitive membrane and are formed with an approximately rectangular cross-section. The local reinforcement structures on the outer side of the self-supporting area of the pressure-sensitive membrane are defined on the basis of a first parameter and a second parameter. The first parameter specifies a thickness of the reinforcement structure, and the second parameter describes an overlap of the reinforcement structure. The overlap extends from the particular region of the self-supporting area of the pressure-sensitive membrane toward the reduced membrane thickness of the self-supporting area. The mechanical load on the outer side of the self-supporting area of the membrane decreases nearly uniformly to the right and to the left, starting from the load peak or maximum load in the particular regions of the self-supporting area of the membrane where the membrane thickness of the self-supporting area of the membrane changes. Accordingly, the shape of the local reinforcement structures on the outer side of the self-supporting area can advantageously be adapted to the mechanical loading behavior of the self-supporting area of the membrane. The geometry and localization of the local reinforcement structures can be simply described using two parameters. The local reinforcement structures need not have to have an exact rectangular cross-section but may also comprise rounded or beveled ends, for example.

In a further embodiment of the present invention, the first parameter t correlates with the membrane thickness T of the self-supporting area, and the second parameter o correlates with a deformable membrane length L of the self-supporting area. The first parameter t is in a range of t=0 to t=0.5T, and the second parameter o is in a range of o=0 to o=0.2L. If the first parameter does not exceed half the membrane thickness T of the self-supporting area and the value of the second parameter is not more than 20 percent of the deformable membrane length L of the self-supporting area, it can reliably be ensured that the local reinforcement structure, together with the self-supporting area of the membrane, can deform well with an acting external pressure $p_{ext}$ and that the length of the reinforcement structure is sufficiently selected to bring about a reduction in the mechanical load. By correctly combining the two mentioned parameters, unnecessary stiffening of the membrane or of the self-supporting area of the membrane can be avoided. The values of the two parameters should thus advantageously be in the mentioned range in order to provide an optimal functionality and maximum robustness of the pressure sensor device. Although the ranges of the two parameters are independent of one another, the optimal values for the first and second parameters are linked to one another and may be determined, for example, using an optimization method in the form of an FEM simulation (finite element method).

In a further embodiment of the present invention, the local reinforcement structures are arranged on the inner side of the self-supporting area of the pressure-sensitive membrane in the particular regions where the membrane thickness of the self-supporting area changes and edges are respectively formed on the self-supporting area. The local reinforcement structures on the inner side of the self-supporting area of the pressure-sensitive membrane are defined on the basis of a third parameter and a fourth parameter. The third parameter specifies a first extension of the local reinforcement structure along a first direction of an edge of the self-supporting area and the fourth parameter describes a second extension of the local reinforcement structure along a second direction of the edge of the self-supporting area. The edges on the inner side of the self-supporting area of the membrane are singularities or load peaks, with greatly increased mechanical load compared to the mechanical load on the planar surface on the outer side of the self-supporting area of the membrane. The singularities may be "mitigated" by the local reinforcement structures on the inner side of the self-supporting area. The dimension of the local reinforcement structures on the inner side can likewise be described simply via two parameters. In particular, using the local reinforcement structures, damage or material breakage on the inner side of the self-supporting area can be advantageously avoided. The edges may also be slightly rounded in reality.

In a further embodiment of the present invention, the local reinforcement structures are formed with an approximately triangular cross-section on the inner side of the self-supporting area of the pressure-sensitive membrane. The third parameter $c_h$ and the fourth parameter $c_v$ each correlate with the membrane thickness T of the self-supporting area of the pressure-sensitive membrane. The third parameter $c_h$ and the fourth parameter $c_v$ are each in a range of $c_h$=0 to $c_h$=0.5T and $c_v$=0 to $c_v$=0.5T. The local reinforcement structures on the inner side of the self-supporting area of the membrane are also limited in dimension, like the local reinforcement structures on the outer side of the self-supporting area, in order to ensure the best possible mitigation of the singularities, i.e., reduction of the mechanical load, while maintaining the sensitivity of the pressure sensor device. The specified ranges for the values of the third parameter $c_h$ and the fourth parameter $c_v$ have been achieved with, for example, the underlying manufacturing technology and the FEM simulation used and may also vary if the technology is different. Accordingly, the advantages described above also apply without restriction to this embodiment.

In a further embodiment of the present invention, the local reinforcement structures are formed with an approximately domed cross-section on the inner side of the self-supporting area of the pressure-sensitive membrane. Almost no limits are set on the specific configuration of the local reinforcement structures on the inner side of the self-supporting area; these structures are only limited by the underlying technology in the production. Even using domed local reinforcement structures, a weakening of the mechanical singularities can advantageously be brought about.

Furthermore, according to the present invention, a manufacturing method for a micromechanical component having local reinforcement structures on an outer side of a self-supporting area of a membrane for a capacitive pressure sensor device is provided. According to an example embodiment of the present invention, the manufacturing method comprises the steps of:
  providing a substrate, an interlayer, a frame structure on top of and/or on the substrate, which structure frames a partial surface of the substrate and/or the interlayer applied to the substrate, at least one electrode, and a cavity to be formed from at least one insulation layer in the further course of the process,
  performing a structuring process,
  applying an electrically conductive layer, wherein the electrically conductive layer follows a topography generated by the structuring process,
  performing a further structuring process to form the local reinforcement structures,
  applying a further electrically conductive layer, and
  forming a pressure-sensitive membrane from the further electrically conductive layer using the frame structure, in such a way that a self-supporting area of the pressure-sensitive membrane spans the framed partial surface and/or the framed interlayer so that the action of an external pressure $p_{ext}$ brings about a deformation of the pressure-sensitive membrane on an outer side of the self-supporting area, wherein the outer side is directed away from the partial surface and/or the interlayer, wherein the self-supporting area of the pressure-sensitive membrane has at least one movable counterelectrode directed toward the framed partial surface and/or the interlayer, and wherein the local reinforcement structures are formed on a surface of the further electrically conductive layer. The manufacture of the local reinforcement structure does not require any expensive additional steps but can be simply integrated into the entire manufacturing process. In particular, the proposed manufacturing method provides high flexibility with respect to the individual layers and structuring processes used.

Moreover, according to the present invention, a manufacturing method for a micromechanical component having local reinforcement structures on an inner side of a self-supporting area of a membrane for a capacitive pressure sensor device is provided. According to an example embodiment of the present invention, the manufacturing method comprises the steps of:

providing a substrate, an interlayer,
  a frame structure on top of and/or on the substrate, which structure frames a partial surface of the substrate and/or the interlayer applied to the substrate, at least one electrode, and a cavity to be formed from at least one insulation layer in the further course of the process,
performing a structuring process to form local reinforcement structures,
performing a further structuring process to generate the local reinforcement structures,
applying an electrically conductive layer, wherein the electrically conductive layer follows a topography generated by the preceding structuring process, and
forming a pressure-sensitive membrane from the electrically conductive layer using the frame structure, in such a way that a self-supporting area of the pressure-sensitive membrane spans the framed partial surface and/or the framed interlayer so that the action of an external pressure $p_{ext}$ brings about a deformation of the pressure-sensitive membrane on an outer side of the self-supporting area,
wherein the outer side is directed away from the partial surface and/or the interlayer, wherein the self-supporting area of the pressure-sensitive membrane has at least one movable counterelectrode directed toward the framed partial surface, and
wherein the electrically conductive layer has the local reinforcement structures.

The manufacture of the local reinforcement structure does not require any expensive additional steps but can be simply integrated into the entire manufacturing process. In particular, the proposed manufacturing method provides high flexibility with respect to the individual layers and structuring processes used.

Furthermore, according to an example embodiment of the present invention, a manufacturing method is provided that combines the two manufacturing methods mentioned above with one another in order to provide a micromechanical component having local reinforcement structures on an outer side and on an inner side of a self-supporting area of a membrane for a capacitive pressure sensor device. In this case, the above-mentioned method steps are combined with one another, wherein steps occurring redundantly in the two manufacturing methods are performed once in the combined manufacture. In this way, a maximum possible flexibility for providing local reinforcement structures can thus be achieved. In particular, the individual manufacturing steps can be simply combined with one another in order to save resources and costs.

The advantageous designs and developments of the present invention explained above and/or below can be applied individually or in any combination with one another, except in cases of clear dependencies or incompatible alternatives, for example.

The above-described properties, features, and advantages of the present invention and the way in which they are achieved become clearer and more readily comprehensible in connection with the following description of exemplary embodiments, which are explained in more detail in connection with the schematic drawings.

BRIEF DESCRIPTION OF THE DRAWINGS

FIG. 3B shows a schematic representation of a proposed micromechanical component having local reinforcement structures according to a first embodiment of the present invention.

FIGS. 4A to 4C show schematic representations of a proposed micromechanical component having local reinforcement structures according to a second embodiment of the present invention.

FIGS. 5A to 5E show schematic representations of a manufacturing method for the micromechanical component in FIG. 3B.

FIGS. 6A to 6D show schematic representations of a manufacturing method for the micromechanical component in FIG. 4C.

FIGS. 7A to 7F show schematic representations of a manufacturing method for the micromechanical component in FIG. 4D.

DETAILED DESCRIPTION OF EXAMPLE EMBODIMENTS

It is pointed out that the figures are merely schematic in nature and not to scale. In this sense, components and elements shown in the figures may be shown exaggeratedly large or reduced in size for better understanding. It is furthermore pointed out that the reference signs in the figures have been selected unchanged for elements and/or components that are designed identically.

Figure 1:
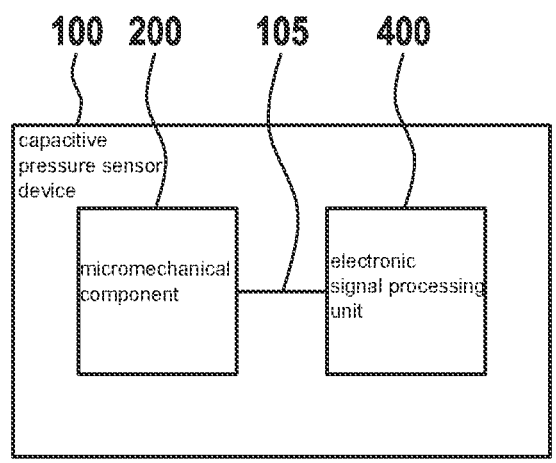
FIG. 1 shows a schematic representation of a capacitive pressure sensor device, according to an example embodiment of the present invention.

FIG. 1 shows a greatly simplified schematic representation of a capacitive pressure sensor device 100. The capacitive pressure sensor device 100 comprises a micromechanical component 200, for example a MEMS component (MEMS: micro electromechanical system). Furthermore, the pressure sensor device 100 comprises an electronic signal processing unit 400. For example, the electronic signal processing unit 400 may be designed as an ASIC and may be provided for generating a measurement signal via an external pressure $p_{ext}$ acting on the micromechanical component. For example, the measurement signal may be generated based on an evaluation of an applied voltage or of a capacitance between at least one electrode (not shown in FIG. 1) of the micromechanical component 200 and at least one movable counterelectrode (also not shown) of the micromechanical component 200. In particular, the at least one electrode of the micromechanical component 200 and the movable counterelectrode of the micromechanical component 200 may each form capacitor plates of a capacitor. Their distances may vary as a result of a movement of a pressure-sensitive membrane, due to the external pressure $p_{ext}$ acting on the membrane, wherein the membrane may comprise the at least one movable counterelectrode, for example. Thus, both the capacitance and the charge of the capacitor are dependent on the external pressure $p_{ext}$. The electrical voltage applied to the capacitor plates is pressure-independent. So that the electronic signal processing unit 400 can generate such a measurement signal, the micromechanical component 200 is connected to the electronic signal processing unit 400 using at least one electronic connection 105. The electrical connection 105 may be realized as a bond wire, for example. Moreover, alternative configurations are conceivable.

For example, in the schematic representation in FIG. 1, the micromechanical component 200 and the electronic signal processing unit 400 are shown side by side. However, the capacitive pressure sensor device 100 is not limited to this arrangement but may also comprise the electronic signal processing unit 400 and the micromechanical component 200 in the form of a stacked or layered arrangement one on top of the other. Moreover, further components and/or electrical connections 105 may be provided, which are not included in the simplified representation in FIG. 1.

Figure 2A:
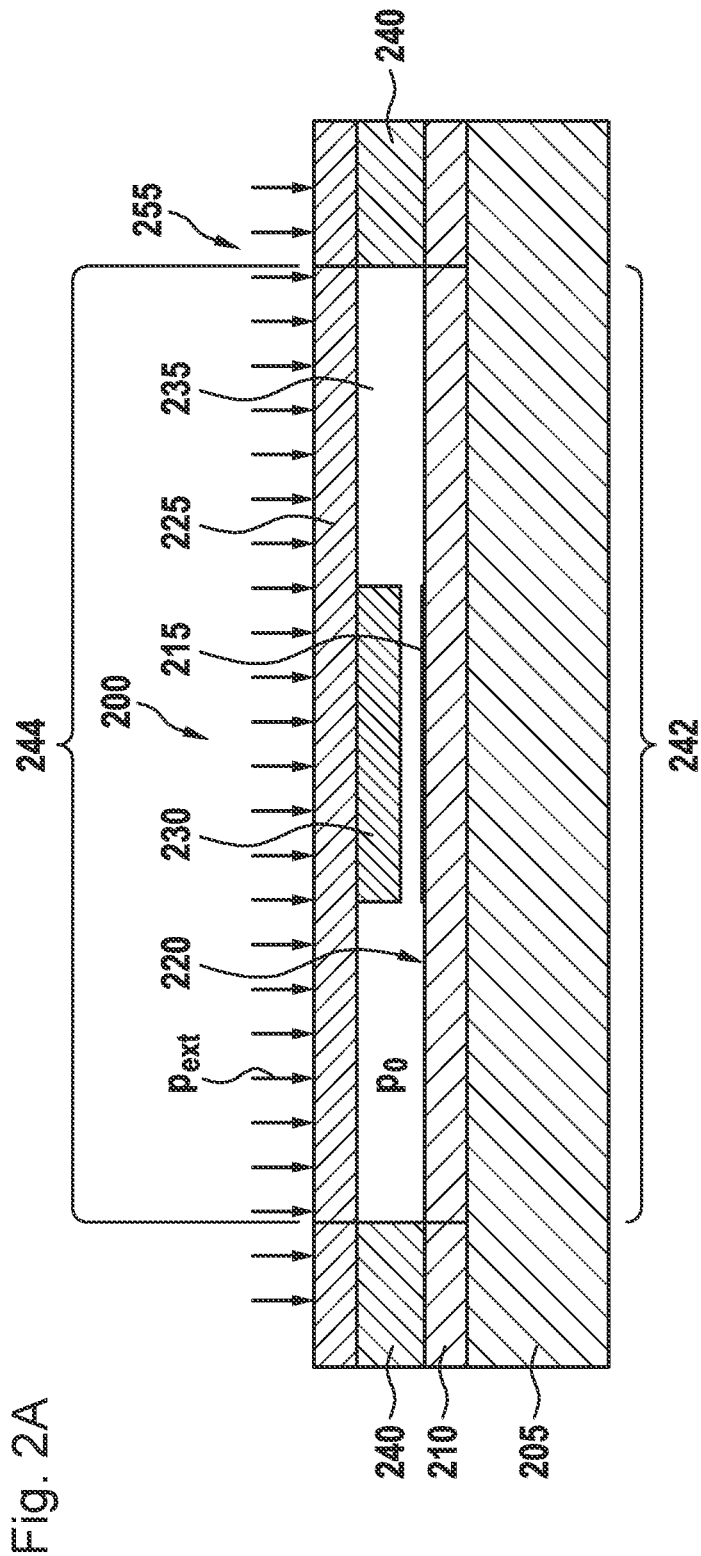
FIGS. 2A and 2B show schematic cross-sectional representations of a micromechanical component for a capacitive pressure sensor device in FIG. 1.
Figure 2B:
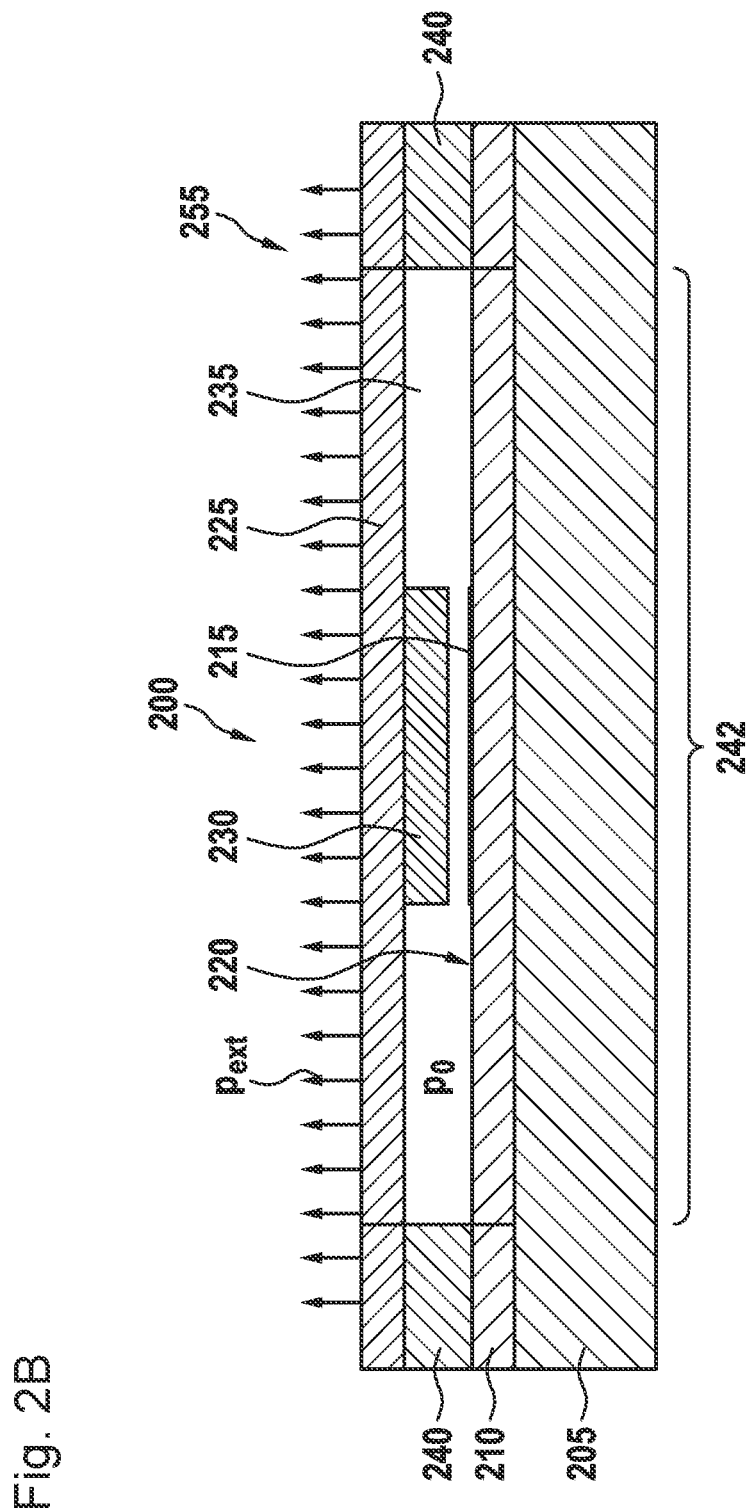

FIGS. 2A and 2B show schematic cross-sectional representations of a micromechanical component 200 for the capacitive pressure sensor device 100 in FIG. 1. The micromechanical component 200 comprises a substrate 205. The latter may, for example, be made from a wafer of monocrystalline silicon. An interlayer 210 may be applied to the substrate 205, wherein the interlayer 210 may correspond to a single layer and/or may comprise further sublayers. The interlayer 210 comprises at least one electrode 215 on a surface of the interlayer 220. The micromechanical component 200 furthermore comprises a frame structure 240, which frames, for example, the interlayer 210 in FIGS. 2A and 2B. Furthermore, the frame structure 240 may also frame a partial surface of the substrate 242. A pressure-sensitive membrane 225, on which the external pressure $p_{ext}$ acts, may be mounted on the frame structure 240. The pressure-sensitive membrane 225 may in particular be thick-structured in a self-supporting area 244 in order to obtain a targeted, advantageous deformation of the membrane 225. The self-supporting area 244 of the membrane 225 spans the framed partial surface of the substrate 242 and the framed interlayer 210. By the action of the external pressure $p_{ext}$ on the membrane 225, the membrane 225 deforms predominantly in the area of thinner thickness, the self-supporting area 244, and thereby on an outer side of the self-supporting area 255. The membrane 225 moreover has at least one movable counterelectrode 230, wherein the voltage described above is applied to the movable counterelectrode 230 and the at least one electrode 215. The two electrodes are oriented toward one another.

Figure 2C:
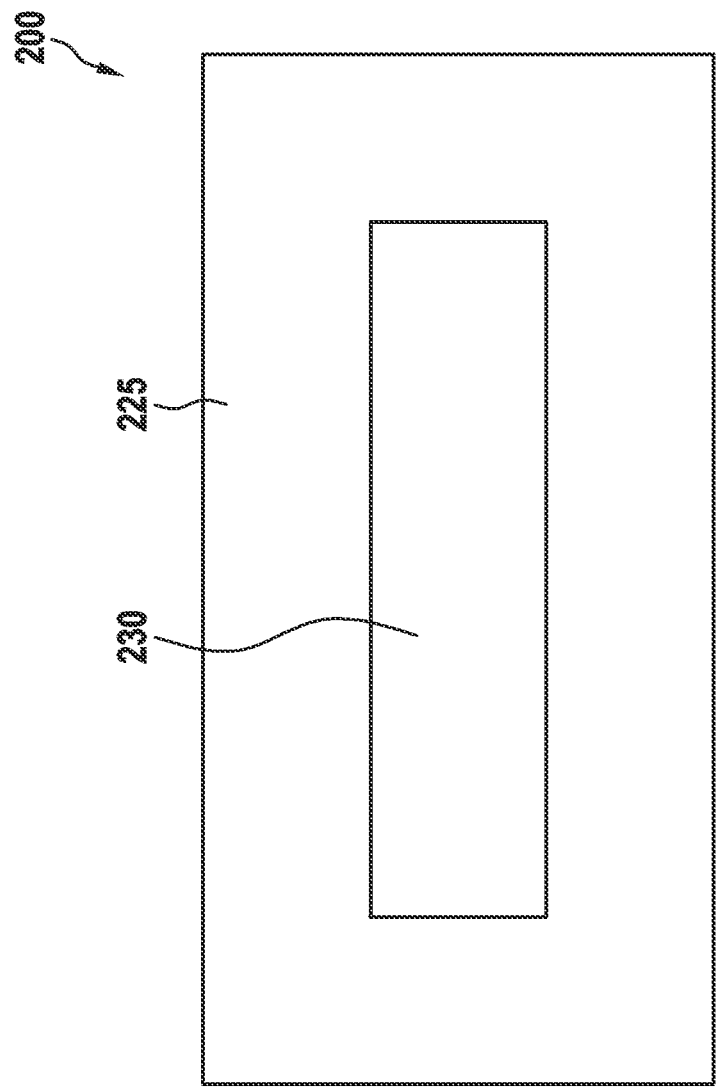
FIG. 2C shows a schematic top view of the micromechanical component shown in FIGS. 2A and 2B.

The micromechanical component 200 furthermore has a sealed cavity 235 having a reference pressure $p_0$. For example, the reference pressure $p_0$ may approximately specify the pressure in vacuo. The cavity 235 is surrounded by the membrane 225 and the frame structure 240, as well as by the interlayer 210. The pressure sensor device 100 in FIG. 1 is typically designed for a working range of up to 1.25 bar, i.e., external pressures $p_{ext}$ up to 1.25 bar act on it. However, also conceivable are scenarios in which the pressure sensor device 100 can withstand considerably higher pressures (e.g., up to 20 bar) without being damaged (forces in the range of about 0.1 N may already be sufficient to damage the membrane 225); for example, this may be the case in the production process of the pressure sensor device 100 or, for example, if the pressure sensor device 100 is used in a clock during an immersion process. For example, FIG. 2A shows such an excess pressure drop at pressures up to 20 bar, which may occur in the production process of the pressure sensor device 100, and in which the self-supporting area 244 of the membrane 225 is pushed downward, i.e., toward the partial surface 242 or the interlayer 210. FIG. 2B shows another scenario in the manufacture of the micromechanical component 200, for example a removal process or debonding process of the micromechanical component 200, which results in the self-supporting area 244 of the membrane 225 being pulled upward, i.e., away from the interlayer 210. FIG. 2C moreover shows a schematic top view of the micromechanical component 200 shown in FIGS. 2A and 2B, with the at least one counterelectrode 230 and the membrane 225, wherein the at least one counterelectrode 230 reinforces the self-supporting area 244.

Figure 3A:
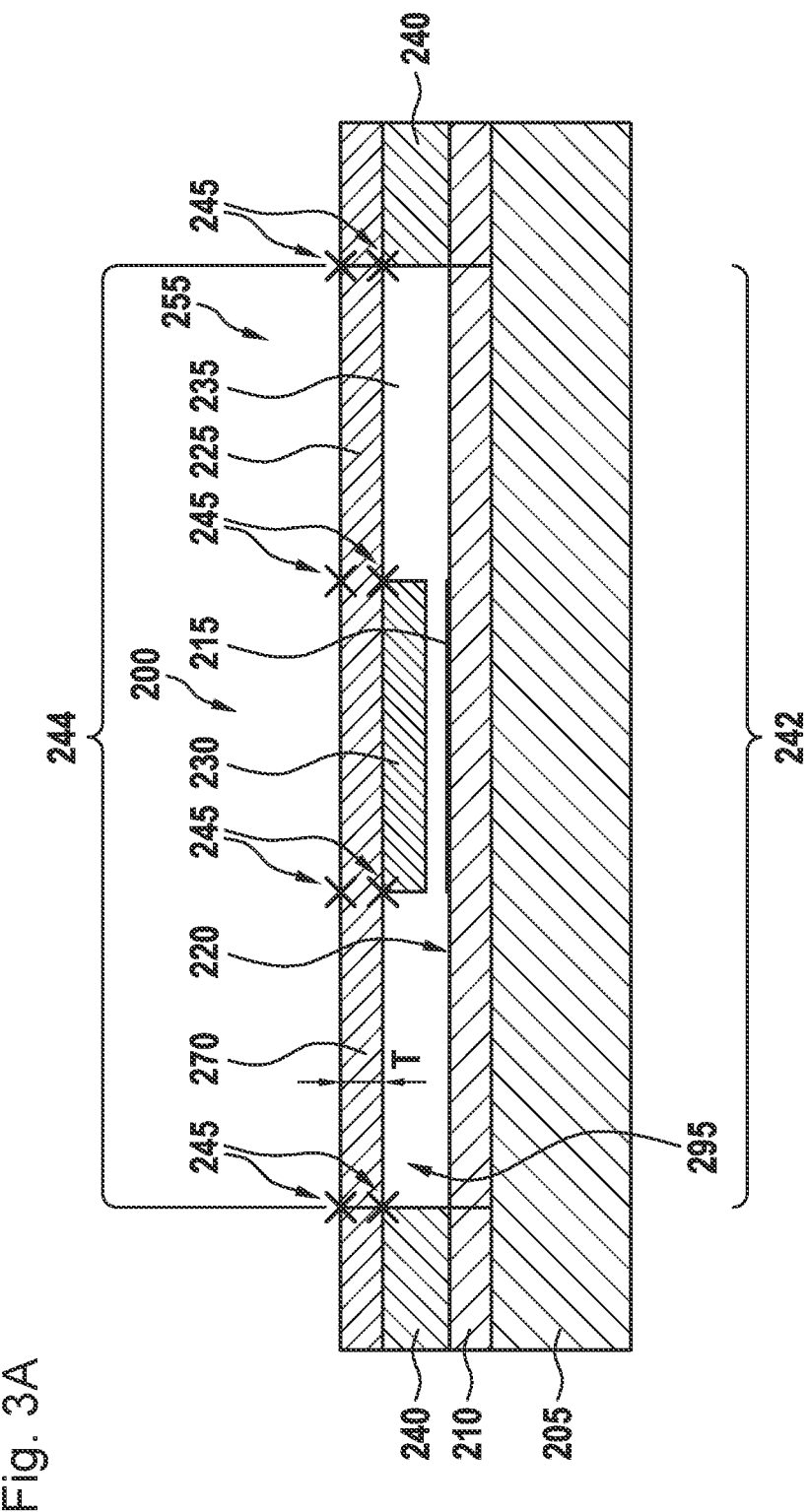
FIG. 3A shows a schematic cross-sectional representation of the micromechanical component shown in FIGS. 2A to 2C, with marked positions of high mechanical stress with a mechanical load acting on the component (deformation not shown).

Using a FEM (FEM: finite element method) simulation, the mechanical load distribution or the stress distribution on the micromechanical component 200 can, for example, be represented. This simulation shows that the stress distribution or load distribution on the free-supporting area 244 and on edge areas of the membrane 225 is not the same everywhere but is locally limited to few particular regions of the self-supporting area 245. This is shown in FIG. 3A. The particular regions of the self-supporting area 245 where the mechanical load is increased, i.e., results in a load peak or stress peak, are thus precisely those regions where a membrane thickness of the self-supporting area 270 changes. For example, the mechanical load on the particular regions 245 in FIG. 3A is higher by a factor of 3 than in other areas of the membrane 225. The membrane thickness of the self-supporting area 270 is thus directly linked to the mechanical load resulting on the self-supporting area 244. This is indicated in FIG. 3A with crosses on an outer side of the self-supporting area 255 of the membrane 225 and on an inner side of the self-supporting area 295 of the membrane 225. The membrane thickness of the self-supporting area 270 changes in particular in the edge areas of the self-supporting area 244 and in the area of the movable counterelectrode 230 since the self-supporting area 244 of the membrane 225 is, for example, reinforced there.

FIG. 3B shows a schematic representation of the proposed micromechanical component 200 having local reinforcement structures 250 according to a first embodiment. The micromechanical component 200 may be designed according to the above explanation and have the corresponding components; reference is therefore made to the above description of the micromechanical component 200. In the first embodiment, the local reinforcement structures 250 are mounted on the outer side of the self-supporting area 255, specifically precisely at the particular locations 245 where a stress peak or load peak has occurred in FIG. 3A. For example, the local reinforcement structures 250 in FIG. 3B are formed approximately with a rectangular cross-section 265. However, they may also be rounded and/or formed in an alternative shape, due to the respective boundary conditions and technical capabilities in the production process.

For example, the location and geometry of the local reinforcement structures 250, 265 on the outer side of the self-supporting area 255 of the membrane 225 can, for example, be described using a first parameter t and a second parameter o. The first parameter t specifies a thickness of the reinforcement structure 250, 265, i.e., how much additional material is applied to the outer side of the self-supporting area 255, and the second parameter o describes an overlap of the reinforcement structure 285. For example, an overlap of the local reinforcement structure 250, 265 toward the frame structure 240 is not relevant to the second parameter o since the membrane 225 has a sufficient thickness in this area and does not need to be additionally reinforced. Such an overlap is therefore neither harmful nor helpful. In particular, the mechanical load on the membrane 225 in the area of non-relevant overlap is not as high as in the particular regions of the self-supporting area 245 in FIG. 3A. Accordingly, the overlap of the reinforcement structure 285 in the second parameter o extends from the particular region of the self-supporting area 245, i.e., the cross in FIG. 3A, toward the reduced membrane thickness of the self-supporting area 244 and is used in this form for the simulation. However, the precision in the manufacture of the micromechanical component 200 and of the local reinforcement structure 250, 265 may be limited, and the placement of the local reinforcement structure 250, 265 may thus vary slightly but should have a sufficiently large overlap toward the reduced membrane thickness of the self-supporting area 244 for an optimal result, i.e., an improved robustness of the component 200 against mechanical loads. Additionally, there may also be an overlap toward the edge structure 240, which is however, as mentioned above, usually not relevant.

The first parameter t and the second parameter o both have an effect on the actual value of the mechanical loads on the outer side of the self-supporting area 255 of the membrane 225 and are additionally limited by the technical capabilities in the production. The simulations may help to obtain optimal values for the first parameter t and the second parameter o, wherein the optimal values for the first parameter t and the second parameter o may also be determined independently of one another. The first parameter t accordingly correlates with the membrane thickness T of the self-supporting area 270, and the second parameter o correlates with a deformable membrane length L of the self-supporting area 280. The deformable membrane length L of the self-supporting area 280 is, for example, the area of the self-supporting area 244 of the membrane 225 that is easily deformable since the membrane thickness T of the self-supporting area 280 is less there than in the area of the self-supporting area 244 in which the movable counterelectrode 230 has been mounted.

The first parameter t is in a range of t=0 to t=0.5T, and the second parameter o is in a range of o=0 to o=0.2L. That is to say, the local reinforcement structure 250, 265 should at most have half the membrane thickness T of the self-supporting area 270 so that the self-supporting area 244 of the membrane 225 remains elastic and pressure-sensitive. The overlap of the reinforcement structure 285 should also correspond to at most 20 percent of the deformable membrane length of the self-supporting area 280. The actual optimal values for the first parameter t within the specified interval naturally depends on the second parameter o and the respective technical boundary conditions in the production of the local reinforcement structures 250, 265. For example, with the technology used and using the simulation, an optimal value for the first parameter t=0.2T and an optimal value for the second parameter o=0.036L can be ascertained, wherein the technology used is explained below with reference to FIGS. 5A to 5E, FIGS. 6A to 6D and FIGS. 7A to 7F.

Figure 4D:
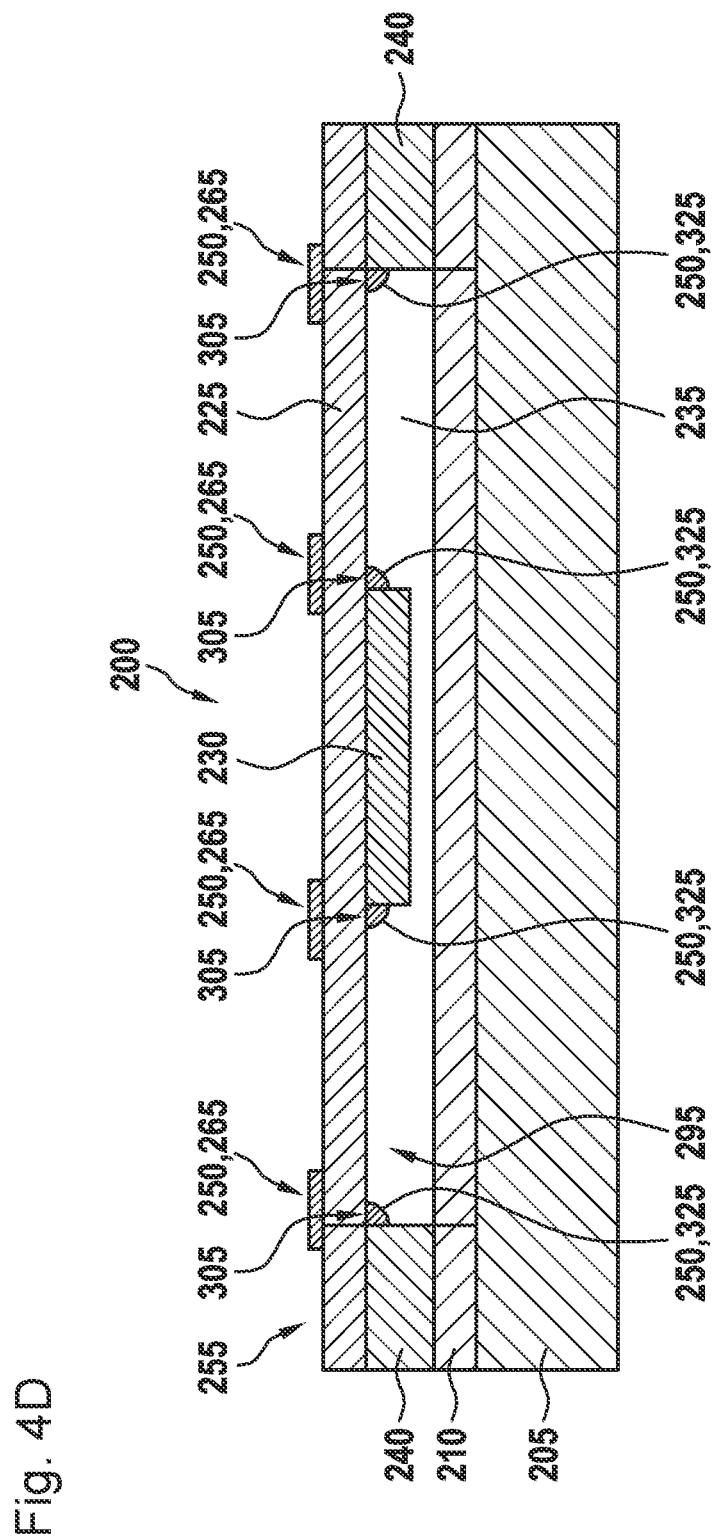
FIG. 4D shows a schematic representation of a proposed micromechanical component having local reinforcement structures according to a third embodiment of the present invention.

FIGS. 4A to 4C show local reinforcement structures 250 arranged on an inner side of the self-supporting area 295 of the membrane 225. In this case, the inner side of the self-supporting area 295 is oriented toward the partial surface 242 or toward the interlayer 210. On the inner side of the self-supporting area 295, the load peaks or stress peaks according to FIG. 3A occur in the regions 245 in which edges 305 are formed on the inner side of the self-supporting area 295. There, the mechanical load is at a maximum. For reasons of simplicity, the edges 305 are shown perpendicular in FIGS. 4A to 4D but may in reality be rounded due to the respective manufacturing process. From a mechanical point of view or according to the linear theory of elasticity, which is not limited to the manufacture of micromechanical components 200 but is generally used in the manufacture of mechanical structures, the edges 305 form singularities. That is to say, they form locations where the stress or load tends toward infinity, and therefore represent critical points that should be avoided in order to prevent material damage or material breakage at the locations.

The proposed local reinforcement structures 250 on the inner side of the self-supporting area 295 of the membrane 225 thus serve to round the edges 305. Since the singularities are locally limited to the edges on the inner side of the self-supporting area 305, and the mechanical load rapidly decreases when the singularities are removed, the proposed local reinforcement structures 250 may effectively contribute to reducing the mechanical load and improving the robustness of the capacitive pressure sensor device 100. It is understood that the number of edges 305 depends on the specific configuration of the micromechanical component 200, and their number and the number of local reinforcement structures 250 may accordingly vary. Consequently, the edges 305 and local reinforcement structures 250 shown in FIGS. 4A to 4D (as well as the local reinforcement structures in FIG. 3B) and the configuration of the micromechanical component 200 have only been chosen by way of example in order to be able to simply explain the proposed principle.

The local reinforcement structures 250 on the inner side of the self-supporting area 295 of the membrane 225 are defined on the basis of a third parameter $c_h$ and a fourth parameter $c_v$, i.e., their size and dimension are described therewith. For example, the third parameter $c_h$ specifies a first extension of the local reinforcement structure along a first direction of an edge of the self-supporting area 310, and the fourth parameter $c_v$ describes a second extension of the local reinforcement structure along a second direction of the edge of the self-supporting area 315. The local reinforcement structures 250 in FIG. 4A are, for example, formed with an approximately triangular cross-section 320, wherein the third parameter $c_h$ describes a first side of the triangle, and the fourth parameter $c_v$ describes a second side of the triangle, and wherein the two sides of the triangle, for example, approximately enclose a right angle with one another. The third parameter $c_h$ and the fourth parameter $c_v$ each correlate with the membrane thickness T, 270 of the self-supporting area 244 of the pressure-sensitive membrane 225. For example, the values for the third parameter $c_h$ and the fourth parameter $c_v$ are each in a range of $c_h$=0 to $c_h$=0.5T and $c_v$=0 to $c_v$=0.5T, thus each correspond to at most half the membrane thickness T, 270 of the self-supporting area 244 of the membrane 225.

The specified ranges of the third and fourth parameters $c_h$, $c_v$ have in particular been defined in a manner that is advantageous from a mechanical point of view. What would be within the framework of what could be manufactured is not taken into account here. In particular, with the underlying technology and the simulation described above, a value of $c_h$=0.2T can be ascertained for the third parameter and a value of $c_v$=0.2T can be ascertained for the fourth parameter, in which the mechanical load is reduced as much as possible and an approximately constant elasticity and ductility of the self-supporting area 244 of the membrane 225 is likewise achieved in spite of the local reinforcement structure 250, 320 used. It is moreover conceivable that for technology used otherwise, other values may be achieved for the third parameter $c_h$ and the fourth parameter $c_v$. It is also conceivable that the two parameters differ in their values from one another so that the local reinforcement structures 250, 320 each have a slightly asymmetric shape in cross-section.

The exact shape of the local reinforcement structures 250, 320 may vary within their dimension. Examples of alternative shapes of the local reinforcement structures 250 on the inner side of the self-supporting area 295 of the membrane 225 are shown in FIGS. 4B and 4C. The local reinforcement structures 250, 325 shown in FIGS. 4B and 4C have, for example, a similar dimension to the local reinforcement structures 250, 320 in FIG. 4A, i.e., they can likewise be described using the third parameter $c_h$ and the fourth parameter $c_v$, and their values are within the ranges mentioned above. In contrast to the representation in FIG. 4A, the local reinforcement structures in FIGS. 4B and 4C have an approximately domed shape in cross-section, wherein the dome in FIG. 4B is directed toward the edge 305 and the dome in FIG. 4C is directed away from the edge 305. FIG. 4D shows the micromechanical component 200 with local reinforcement structures 250 according to a third embodiment. In contrast to the previous figures, the micromechanical component 200 in FIG. 4D has the local reinforcement structures 250 both on the outer side of the self-supporting area 255 of the membrane 225 and on the inner side of the self-supporting area 295 of the membrane 225. In particular, the micromechanical component 200 in FIG. 4D comprises the local reinforcement structures 250, 325 on the inner side of the self-supporting area 295 of the membrane, the dome of which is directed away from the edge 305. In an alternative configuration of the micromechanical component 200, the shape of the local reinforcement structures 250 may deviate from the representation in FIG. 4D and may correspond, for example, to the shape shown in FIG. 4A or 4B.

FIGS. 5A to 5E show schematic representations of a manufacturing method 500 for the proposed micromechanical component 200 with local reinforcement structures 250, 265 on the outer side of the self-supporting area 255 of the membrane 225. In a first method step 505 in FIG. 5A, the substrate 205, the interlayer 210, the frame structure 240 on the substrate 205, which structure frames the interlayer 210 applied to the substrate 205, at least one electrode 215, and a cavity 235 to be formed from at least one insulation layer 203, 204 in the further course of the process are provided. For example, the substrate 205 may be made of monocrystalline silicon material. The interlayer 210 may comprise further sublayers, e.g., as shown, a first insulation layer 201 as well as a second insulation layer 202. The first insulation layer 201 may, for example, consist of silicon oxide (SiO), and the second insulation layer 202 may consist of silicon-rich nitride (SiRiN). In alternative configurations, the interlayer 210 may comprise further sublayers consisting of other materials or may form only a single layer. A first electrically conductive layer 300 may have been applied to the interlayer 210 and may have been subjected to a structuring process 340 in order to form the at least one electrode 215 from the first electrically conductive layer 300. The structuring process 340 may correspond to an etching process. For example, the first electrically conductive layer 300 may consist of polycrystalline silicon material.

A third insulation layer 203 may have been applied to the structured first electrically conductive layer 300 and may fill in any gaps created during the structuring of the first electrically conductive layer 300. The third insulation layer 203, in turn, is subjected to a structuring process 340 in order to subsequently be able to form, for example, the frame structure 240 on the interlayer 210. A second electrically conductive layer 301 is applied to the structured third insulation layer 203. The second electrically conductive layer 301 is subjected to a structuring process 340 in order to subsequently form the counterelectrode 230 and the frame structure 240. The structuring process 340 may correspond to an etching process, as stated above, and this is no longer pointed out in the discussion below. The second electrically conductive layer 301 may also consist of polycrystalline silicon material. A fourth insulation layer 204 is applied to the structured second electrically conductive layer 301. The third and fourth insulation layers 203, 204 are accordingly used to form the cavity 235 and may likewise consist of silicon oxide (SiO or TEOS).

Figure 5A:
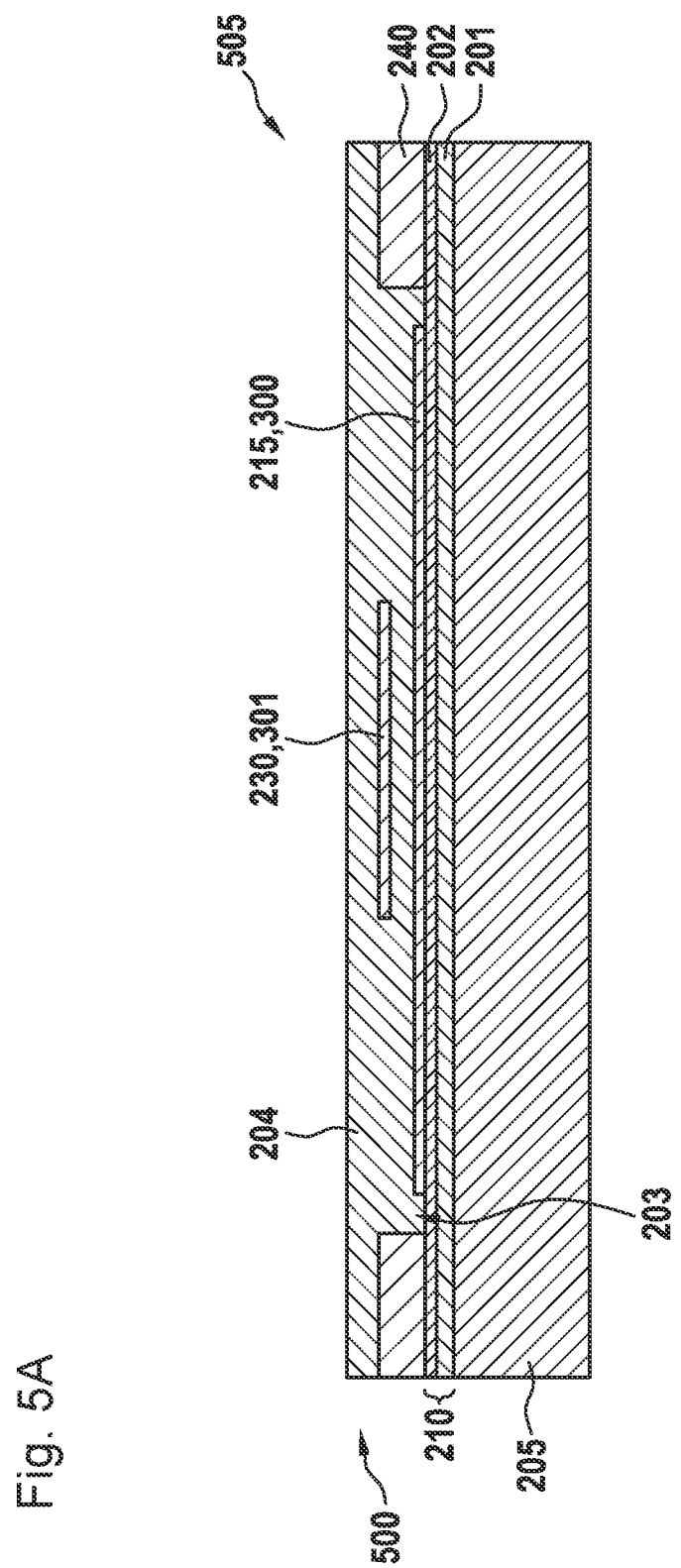
Figure 5B:
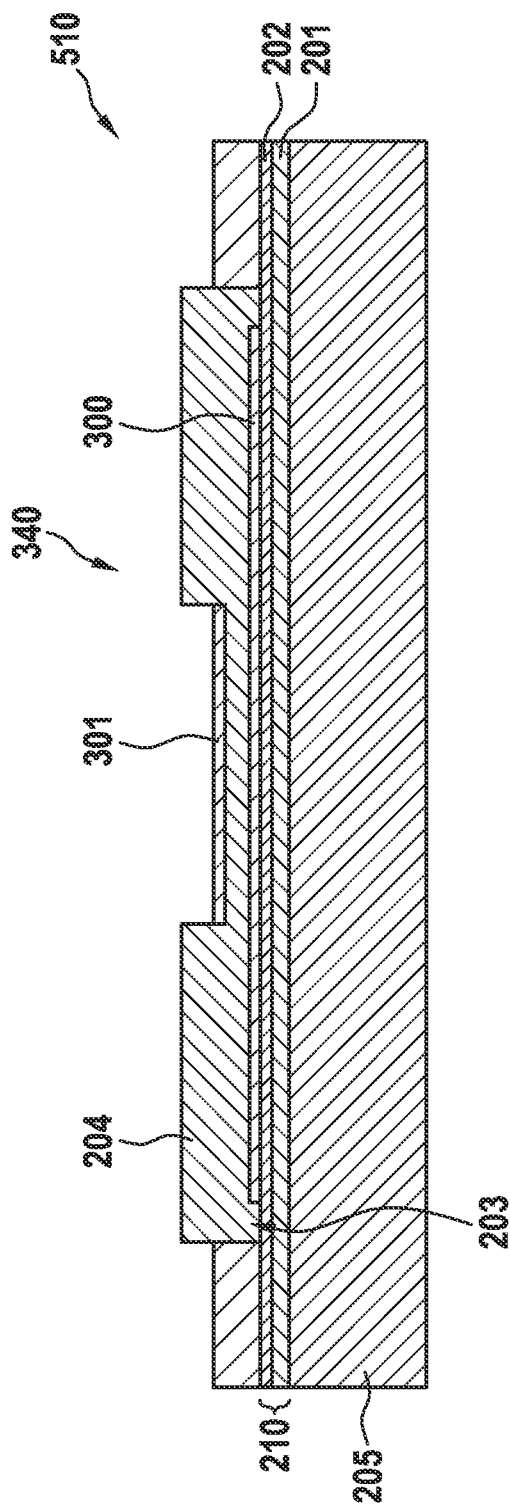

In a second method step 510 in FIG. 5B, a structuring process 340 is performed again in order to structure the fourth insulation layer 204. A third electrically conductive layer 302 that can consist of polycrystalline silicon material, like the first and second electrically conductive layers 300, 301, is applied to the structured fourth insulation layer 204 in a third method step 515 in FIG. 5C. In so doing, the third electrically conductive layer 302 may follow a topography generated by the structuring process 340 of the fourth insulation layer 204. For example, the third electrically conductive layer 302 may be thinner than the first or second electrically conductive layer 300, 301. In a fourth method step 520 in FIG. 5D, the third electrically conductive layer 302 is structured by means of a structuring process 340 in order to form the local reinforcement structures 250, 265. The structuring takes place, for example, in such a way that the material of the third electrically conductive layer 302 is not removed at the locations where the local reinforcement structures 250, 265 are to be formed.

Figure 5E:
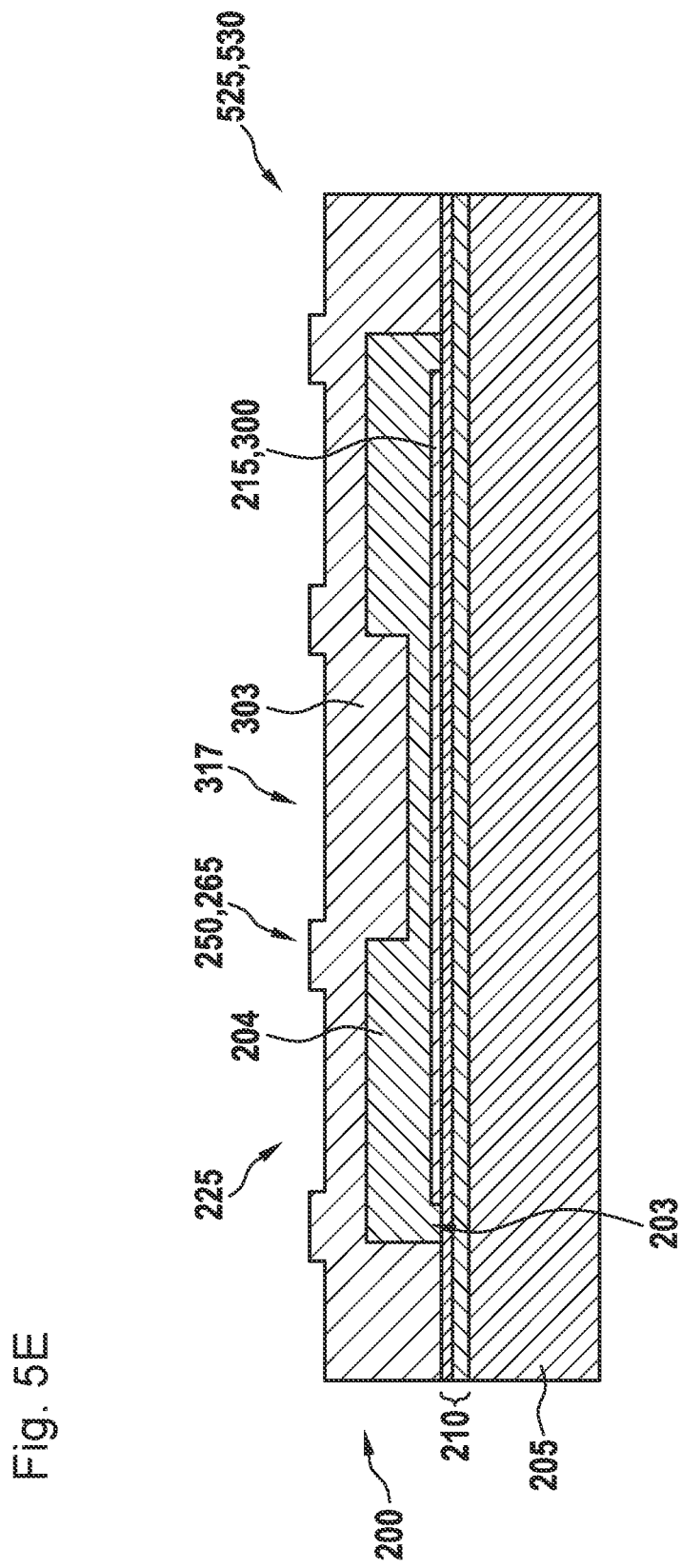

In a fifth method step 525 in FIG. 5E, a fourth electrically conductive layer 303 is applied to the structured third electrically conductive layer 302, wherein the fourth electrically conductive layer 303 follows a topography formed by the preceding structuring processes 340. The fourth electrically conductive layer 303 may likewise consist of polycrystalline silicon material and may, for example, be thicker than the third electrically conductive layer 302. Finally, in a sixth method step 530 in FIG. 5E, the pressure-sensitive membrane 225 is formed from the fourth electrically conductive layer 303 in such a way that the self-supporting area 244 of the pressure-sensitive membrane 225 spans the framed partial surface 242 and/or the framed interlayer 210 by the insulation layers 203, 204 being removed by a suitable process step so that the action of the external pressure $p_{ext}$ brings about a deformation of the pressure-sensitive membrane 225 on the outer side of the self-supporting area 255, wherein the outer side 255 is directed away from the partial surface 242 and/or the interlayer 210, and wherein the self-supporting area 244 of the pressure-sensitive membrane 225 has at least the movable counterelectrode 230 directed toward the framed partial surface 242 and/or the framed interlayer 210. For example, the local reinforcement structures 250 manufactured in this way are formed with an approximately rectangular cross-section 265 on a surface 317 of the fourth electrically conductive layer 303.

Figure 6A:
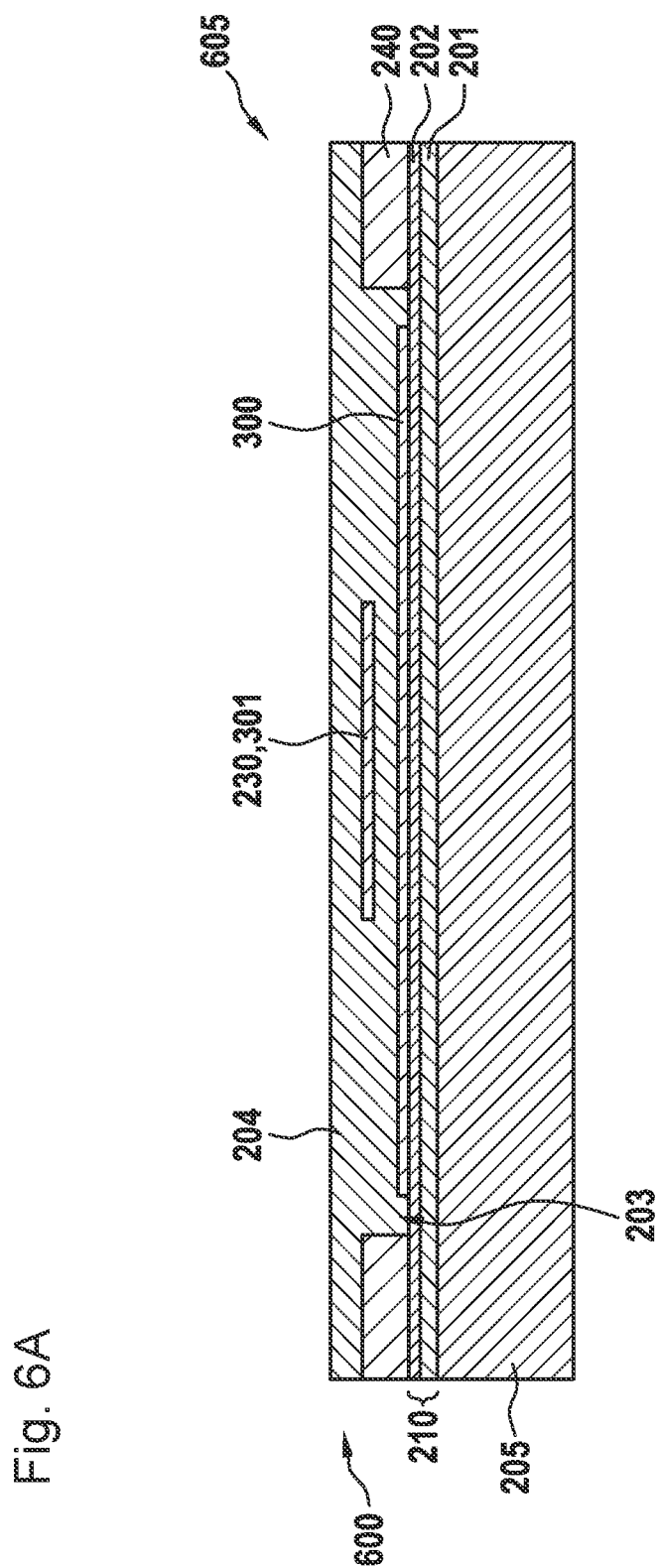
Figure 6B:
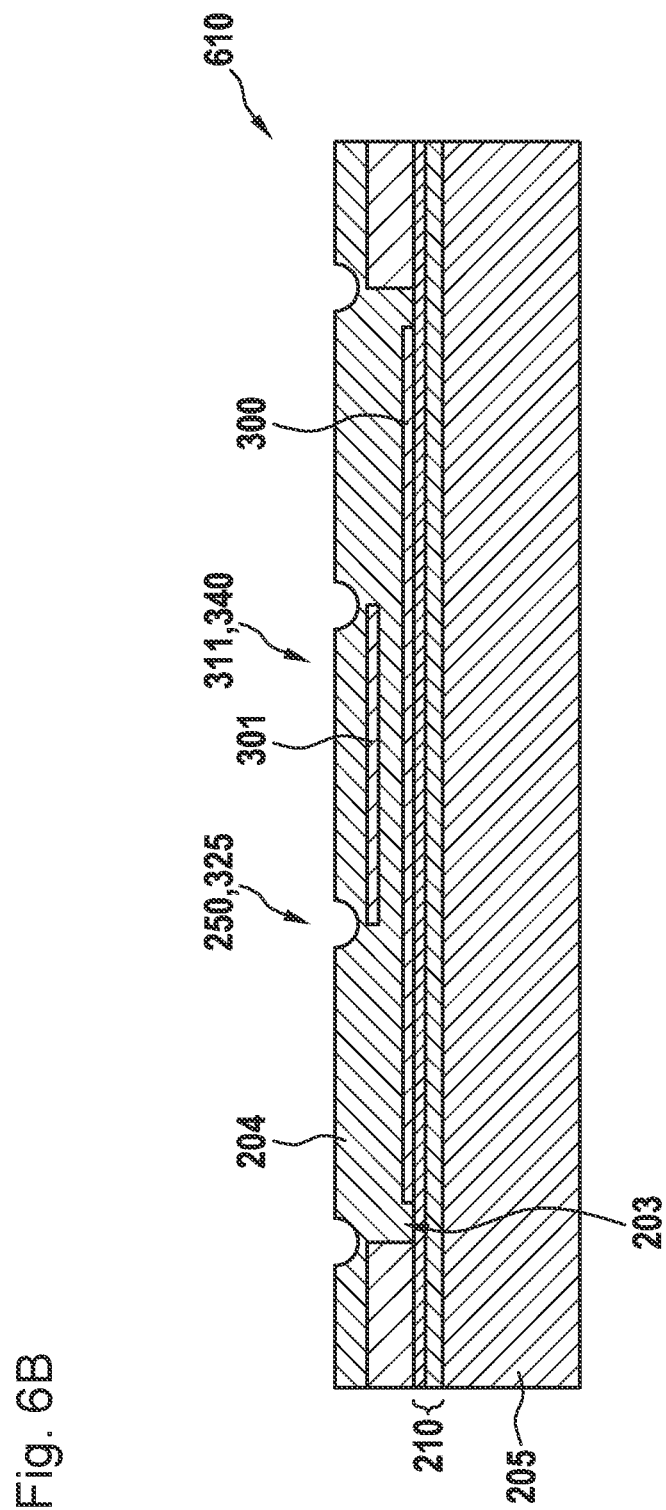
Figure 6D:
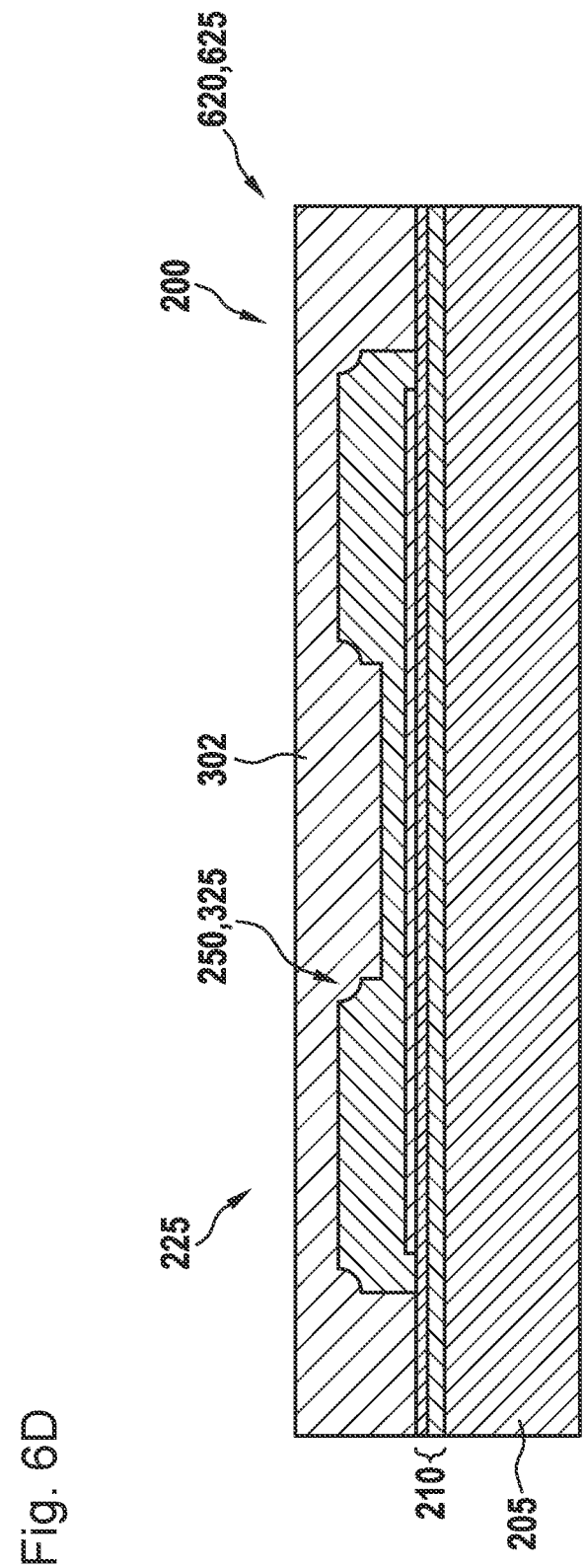
Figure 7B:
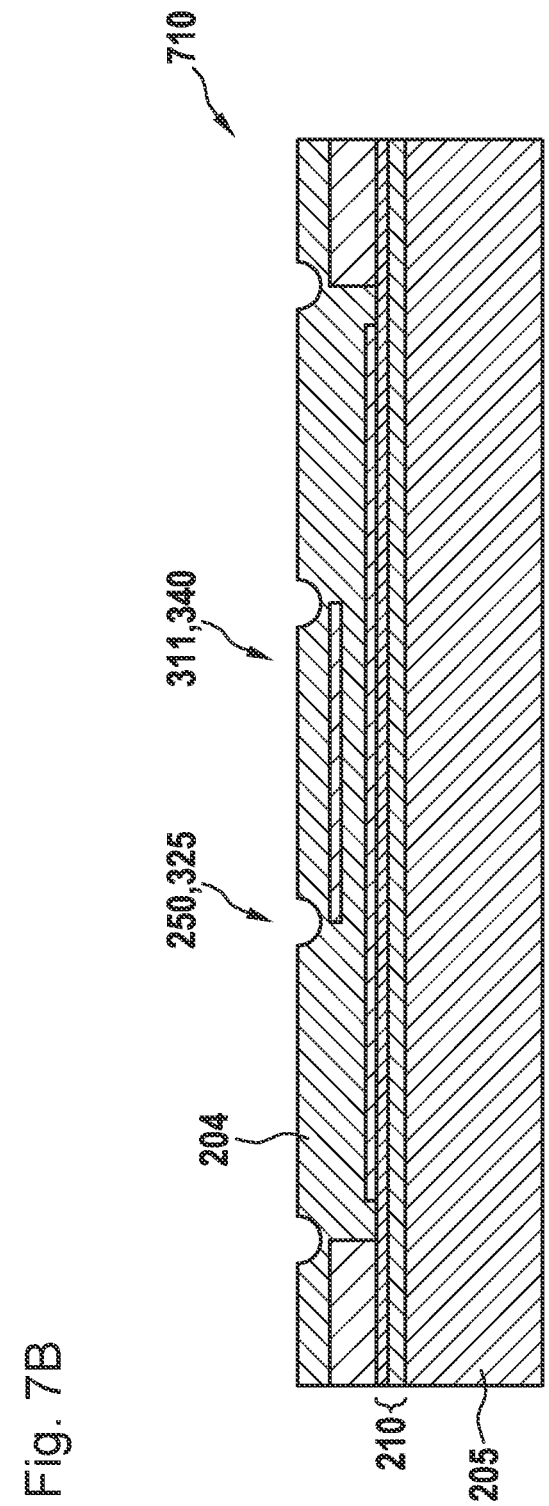
Figure 7C:
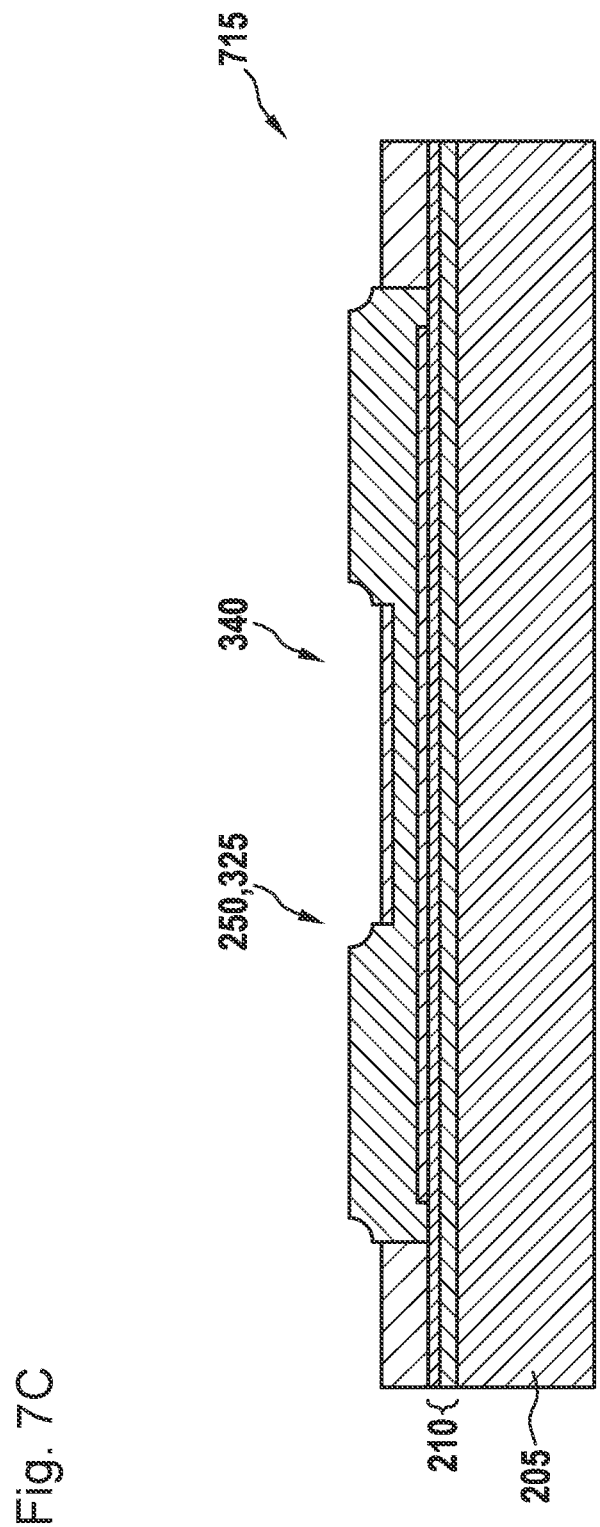
Figure 7D:
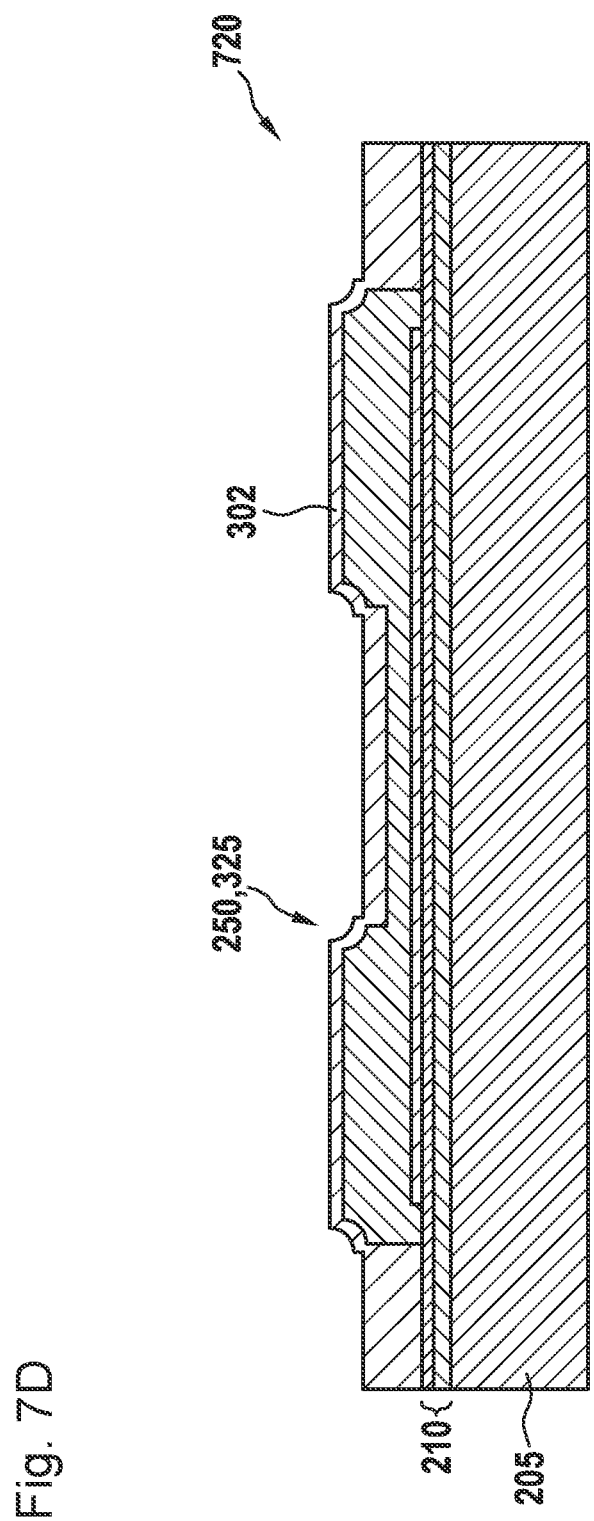
Figure 7F:
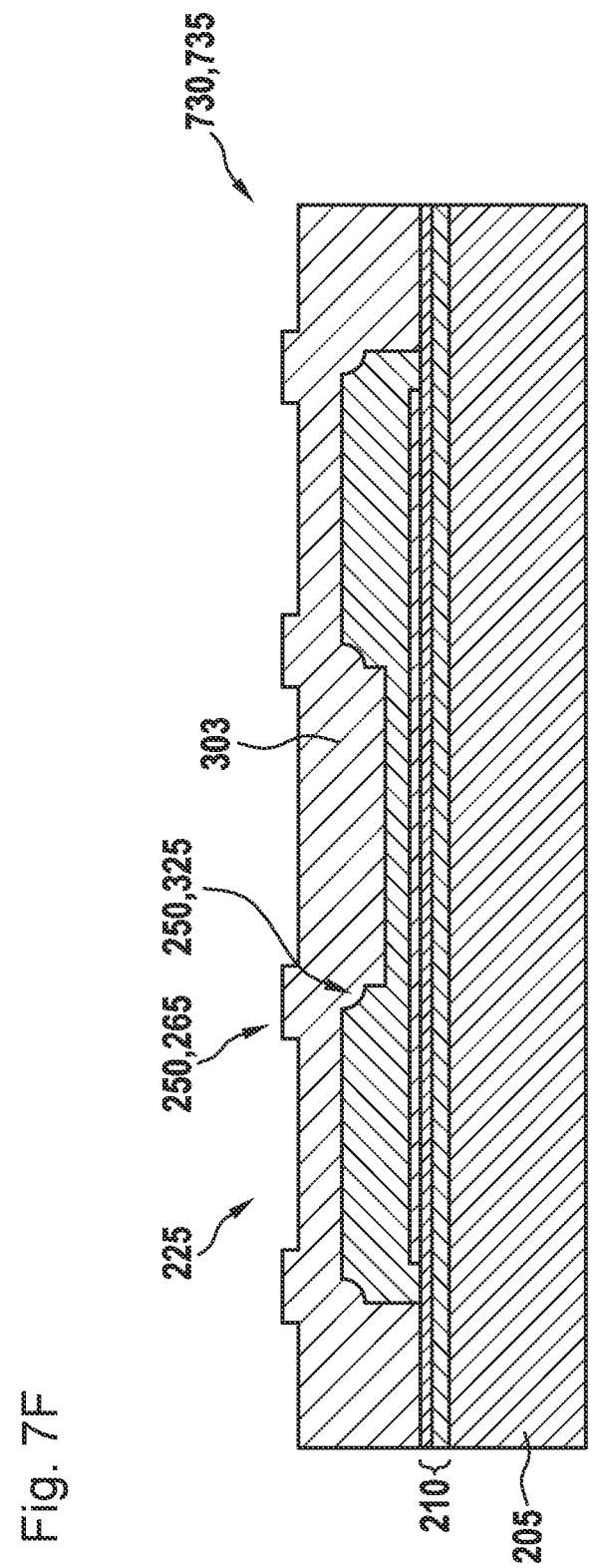

FIGS. 6A to 6D show schematic representations of a manufacturing method 600 for the proposed micromechanical component 200 with local reinforcement structures 250 according to a second embodiment. Here, in contrast to FIGS. 5A to 5E, the local reinforcement structures 250 are formed on the inner side of the self-supporting area 295 of the membrane 225. A first method step 605 in FIG. 6A is, for example, designed analogously to the first method step 505 in FIG. 5A; reference is therefore made to the above contents of said method step in order to avoid repetitions. In contrast to the manufacturing method 500 in FIGS. 5A to 5E, a second method step 610 of the manufacturing method 600 in FIG. 6B comprises performing a structuring process 340 of the fourth insulation layer 204 to form local reinforcement structures 250, 325, wherein the structuring process 340 is preferably designed as an isotropic structuring process 311, i.e., an isotropic etching process. In addition to the isotropic etching process, a further structuring process 340 in the form of an anisotropic etching process may be performed if structuring is needed.

In a third method step 615 in FIG. 6C, the fourth insulation layer 204 is subjected to a further structuring process 340 in order to generate the local reinforcement structures 250, 325 with an approximately domed cross-section, as explained with reference to FIG. 4C. In a fourth method step 620 in FIG. 6D, the third electrically conductive layer 302 is applied, wherein the third electrically conductive layer 302 follows a topography generated by the preceding structuring processes 340, 311, so that the third electrically conductive layer 302 fills in gaps of the structured fourth insulation layer 204 that were formed by the mentioned structuring processes 311, 340 for generating the local reinforcement structures 250, 325. The gaps in the structured fourth insulation layer 204 correspond to the locations where the third electrically conductive layer 302 forms the local reinforcement structures 250, 320. A fifth method step 625 may again be designed analogously to the sixth method step 530 in FIG. 5E, i.e., the formation of the pressure-sensitive membrane 225; at this point, reference is therefore made to the above explanation.

FIGS. 7A to 7F show a further manufacturing method 700 for a micromechanical component 200 having local first reinforcement structures 250, 325 on an inner side 295 and local second reinforcement structures 250, 265 on an outer side 255 of the self-supporting area 244 of the membrane 225. The manufacturing method 700 shown in FIGS. 7A to 7F forms a combination of the manufacturing methods 500, 600 in FIGS. 5A to 5E and 6A to 6D. A first to fourth method step 705, 710, 715, 720 in FIGS. 7A to 7D corresponds, for example, to the first to fourth method steps 605, 610, 615, 620 of the manufacturing method in FIGS. 6A to 6D. A fifth method step 725 in FIG. 7E corresponds to the fourth method step 520 of the manufacturing method 500 in FIG. 5D, i.e., the performance of a structuring process 340 to form the local second reinforcement structures 250, 265. A sixth and seventh method step 730, 735 in FIG. 7F accordingly corresponds to the fifth and sixth method step 525, 530 in FIG. 5E, i.e., the application of the fourth electrically conductive layer 303 and the formation of the membrane 225 from the fourth electrically conductive layer 303. Alternatively, the manufacturing methods 500, 600, and 700 may be implemented, for example, at least in part, by means of stereolithography.

The invention has been described in detail by preferred exemplary embodiments. Instead of the described exemplary embodiments, further exemplary embodiments are conceivable, which may have further modifications or combinations of described features. For this reason, the invention is not limited by the disclosed examples since the person skilled in the art can derive other variations therefrom without departing from the scope of the invention.

The invention claimed is:

1. A micromechanical component for a capacitive pressure sensor device, comprising:
   a substrate;
   a frame structure which frames a partial surface of the substrate and/or an interlayer applied to the substrate, wherein at least one electrode is mounted on the framed partial surface and/or the framed interlayer;
   a pressure-sensitive membrane on which an external pressure acts, wherein the pressure-sensitive membrane is stretched via the frame structure in such a way that a self-supporting area of the pressure-sensitive membrane spans the framed partial surface and/or the framed interlayer, wherein an action of the external pressure brings about a deformation of the pressure-sensitive membrane on an outer side of the self-supporting area, wherein the outer side is directed away from the partial surface and/or the interlayer, wherein the self-supporting area of the pressure-sensitive membrane has at least one movable counter electrode directed toward the framed partial surface and/or the framed interlayer; and
   a sealed cavity having a reference pressure, which is surrounded by the pressure-sensitive membrane and the frame structure;
   wherein the self-supporting area of the pressure-sensitive membrane has local reinforcement structures or increasing a membrane thickness of the self-supporting area, wherein the local reinforcement structures are mounted in particular regions of the self-supporting area where a membrane thickness of the self-supporting area changes.

2. The micromechanical component according to claim 1, wherein the local reinforcement structures are arranged on the outer side of the self-supporting area of the pressure-sensitive membrane, or are arranged on an inner side of the self-supporting area of the pressure-sensitive membrane which is directed toward the partial surface and/or the interlayer, or are arranged on the outer side of the self-supporting area and on the inner side of the self-supporting area of the membrane.

3. The micromechanical component according to claim 2, wherein the local reinforcement structures are arranged on the outer side of the self-supporting area of the pressure-sensitive membrane and are formed with an approximately rectangular cross-section, and wherein the local reinforcement structures on the outer side of the self-supporting area of the pressure-sensitive membrane are defined based on a first parameter and a second parameter, wherein the first parameter specifies a thickness of the reinforcement structure, and the second parameter describes an overlap of the reinforcement structure, wherein the overlap extends from the particular region of the self-supporting area of the pressure-sensitive membrane toward the reduced membrane thickness of the self-supporting area.

4. The micromechanical component according to claim 3, wherein the first parameter t correlates with the membrane thickness of the self-supporting area, and the second parameter o correlates with a deformable membrane length L of the self-supporting area, and wherein the first parameter t is in a range of t=0 to t=0.5T, and the second parameter o is in a range of o=0 to o=0.2L.

5. The micromechanical component according to claim 2, wherein the local reinforcement structures are arranged on the inner side of the self-supporting area of the pressure-sensitive membrane in the particular regions where the membrane thickness of the self-supporting area changes and edges are respectively formed on the self-supporting area, wherein the local reinforcement structures on the inner side of the self-supporting area of the pressure-sensitive membrane are defined based on a third parameter and a fourth parameter, wherein the third parameter specifies a first extension of the local reinforcement structure along a first direction of an edge of the self-supporting area, and the fourth parameter describes a second extension of the local reinforcement structure along a second direction of the edge of the self-supporting area.

6. The micromechanical component according to claim 5, wherein the local reinforcement structures are formed with an approximately triangular cross-section on the inner side of the self-supporting area of the pressure-sensitive membrane, and wherein the third parameter $c_h$ and the fourth parameter cv each correlate with the membrane thickness T of the self-supporting area of the pressure-sensitive membrane, wherein the third parameter $c_h$ and the fourth parameter cv are each in a range of $c_h$=0 to $c_h$=0.5T and $c_v$=0 to $c_v$=0.5T.

7. The micromechanical component according to claim 5, wherein the local reinforcement structures are formed with an approximately domed cross-section on the inner side of the self-supporting area of the pressure-sensitive membrane.

8. A capacitive pressure sensor device, comprising:
 a micromechanical component for a capacitive pressure sensor device, including:
  a substrate,
  a frame structure which frames a partial surface of the substrate and/or an interlayer applied to the substrate, wherein at least one electrode is mounted on the framed partial surface and/or the framed interlayer,
  a pressure-sensitive membrane on which an external pressure acts, wherein the pressure-sensitive membrane is stretched via the frame structure in such a way that a self-supporting area of the pressure-sensitive membrane spans the framed partial surface and/or the framed interlayer, wherein an action of the external pressure brings about a deformation of the pressure-sensitive membrane on an outer side of the self-supporting area, wherein the outer side is directed away from the partial surface and/or the interlayer, wherein the self-supporting area of the pressure-sensitive membrane has at least one movable counterelectrode directed toward the framed partial surface and/or the framed interlayer, and
  a sealed cavity having a reference pressure, which is surrounded by the pressure-sensitive membrane and the frame structure,
  wherein the self-supporting area of the pressure-sensitive membrane has local reinforcement structures or increasing a membrane thickness of the self-supporting area, wherein the local reinforcement structures are mounted in particular regions of the self-supporting area where a membrane thickness of the self-supporting area changes; and
 an electronic signal processing unit configured to generate a measurement signal via the external pressure acting on the micromechanical component, based on an evaluation of a voltage applied between the at least one electrode and the at least one movable counterelectrode, or of a capacitance.

9. A manufacturing method for a micromechanical component having local reinforcement structures on an outer side of a self-supporting area of a membrane for a capacitive pressure sensor device, comprising the following steps:
 providing a substrate, an interlayer, a frame structure on top of and/or on the substrate, the frame structure framing a partial surface of the substrate and/or the interlayer applied to the substrate, at least one electrode, and a cavity to be formed from at least one insulation layer in a further course of the method;
 performing a structuring process;
 applying an electrically conductive layer, wherein the electrically conductive layer follows a topography generated by the structuring process;
 performing a further structuring process to form the local reinforcement structures;
 applying a further electrically conductive layer; and
 forming a pressure-sensitive membrane from the further electrically conductive layer using the frame structure, in such a way that a self-supporting area of the pressure-sensitive membrane spans the framed partial surface and/or the framed interlayer, so that an action of an external pressure brings about a deformation of the pressure-sensitive membrane on an outer side of the self-supporting area;
 wherein the outer side is directed away from the partial surface and/or the interlayer, and wherein the self-supporting area of the pressure-sensitive membrane has at least one movable counterelectrode directed toward the framed partial surface and/or the framed interlayer, and
 wherein the local reinforcement structures are formed on a surface of the further electrically conductive layer.

10. A manufacturing method for a micromechanical component having local reinforcement structures on an inner side of a self-supporting area of a membrane for a capacitive pressure sensor device, comprising the following steps:
 providing a substrate, an interlayer, a frame structure on top of and/or on the substrate, the frame structure framing a partial surface of the substrate and/or the interlayer applied to the substrate, at least one electrode, and a cavity to be formed from at least one insulation layer in a further course of the method;
 performing a structuring process to form local reinforcement structures;
 performing a further structuring process to generate the local reinforcement structures;
 applying an electrically conductive layer, wherein the electrically conductive layer follows a topography generated by the structuring process; and
 forming a pressure-sensitive membrane from the electrically conductive layer using the frame structure, so that a self-supporting area of the pressure-sensitive membrane spans the framed partial surface and/or the framed interlayer so that an action of an external pressure brings about a deformation of the pressure-sensitive membrane on an outer side of the self-supporting area;

wherein the outer side is directed away from the partial surface and/or the interlayer;

wherein the self-supporting area of the pressure-sensitive membrane has at least one movable counterelectrode directed toward the framed partial surface and/or the framed interlayer; and wherein the electrically conductive layer has the local reinforcement structures.

11. A manufacturing method for a micromechanical component having local first reinforcement structures on an inner side and local second reinforcement structures on an outer side of a self-supporting area of a membrane for a capacitive pressure sensor device, the method comprising the following steps:

providing a substrate, an interlayer, a frame structure on top of and/or on the substrate, the frame structure framing a partial surface of the substrate and/or the interlayer applied to the substrate, at least one electrode, and a cavity to be formed from at least one insulation layer in a further course of the method;

performing a structuring process to form the local first reinforcement structures;

performing a further structuring process to generate the local first reinforcement structures;

applying an electrically conductive layer, wherein the electrically conductive layer follows a topography generated by the structuring process;

performing a further structuring process to form the local second reinforcement structures;

applying a further electrically conductive layer, wherein the further electrically conductive layer follows a topography generated by the structuring process; and forming a pressure-sensitive membrane from the further electrically conductive layer using the frame structure, in such a way that a self-supporting area of the pressure-sensitive membrane spans the framed partial surface and/or the framed interlayer so that an action of an external pressure brings about a deformation of the pressure-sensitive membrane on an outer side of the self-supporting area, wherein the outer side is directed away from the partial surface and/or the interlayer, and wherein the self-supporting area of the pressure-sensitive membrane has at least one movable counterelectrode directed toward the framed partial surface and/or the framed interlayer, and wherein the local second reinforcement structures are formed on a surface of the further electrically conductive layer.

* * * * *